(12) United States Patent
Pankov

(10) Patent No.: US 12,286,011 B2
(45) Date of Patent: *Apr. 29, 2025

(54) USER DEVICE FOR GENERATING A GRAPHICAL USER INTERFACE

(71) Applicant: Boris Valerevich Pankov, Alicante (ES)

(72) Inventor: Boris Valerevich Pankov, Alicante (ES)

(73) Assignee: Boris Pankov, Alicante (ES)

( * ) Notice: Subject to any disclaimer, the term of this patent is extended or adjusted under 35 U.S.C. 154(b) by 369 days.

This patent is subject to a terminal disclaimer.

(21) Appl. No.: 17/536,042

(22) Filed: Nov. 28, 2021

(65) Prior Publication Data

US 2022/0363130 A1    Nov. 17, 2022

(30) Foreign Application Priority Data

May 14, 2021    (RU) ................................. 2021113778

(51) Int. Cl.
*B60K 35/00*    (2024.01)
*B60K 35/10*    (2024.01)
(Continued)

(52) U.S. Cl.
CPC .............. *B60K 35/00* (2013.01); *G06F 9/451* (2018.02); *G07C 5/04* (2013.01); *B60K 35/23* (2024.01);
(Continued)

(58) Field of Classification Search
CPC ............... B60K 35/00; B60K 2370/11; B60K 2370/1529; B60K 2370/167;
(Continued)

(56) References Cited

U.S. PATENT DOCUMENTS

| 5,781,119 A | 7/1998 | Yamashita et al. |
| 6,226,588 B1 * | 5/2001 | Teramura ................. G01D 7/04 123/319 |

(Continued)

FOREIGN PATENT DOCUMENTS

| DE | 102010029467 | 12/2011 |
| EP | 2477011 | 7/2012 |

(Continued)

OTHER PUBLICATIONS

Johannes Asamer et al.: "Sensitivity analysis for energy demand estimation of electric vehicles", https://www.sciencedirect.com/science/article/pii/S1361920915300250.

(Continued)

*Primary Examiner* — Wade Miles
*Assistant Examiner* — Kyle T Johnson
(74) *Attorney, Agent, or Firm* — Chad Peterson

(57) ABSTRACT

The proposed invention relates to methods for controlling energy consumption by a motor vehicle, and can be used in transportation industry. The technical problem to be solved by the claimed invention is to provide a user device that do not possess the drawbacks of the prior art and thus make it possible to generate an accurate energy-efficient track for a motor vehicle that allows to reduce energy consumption by the motor vehicle on the specific portion of the route, as well as to reliably signal about energy consumption by the motor vehicle and the ways of reducing its energy consumption.

12 Claims, 9 Drawing Sheets

(51) Int. Cl.
- *B60K 35/23* (2024.01)
- *B60K 35/28* (2024.01)
- *B60K 35/29* (2024.01)
- *B60K 35/60* (2024.01)
- *G06F 9/451* (2018.01)
- *G07C 5/04* (2006.01)
- *B60K 35/85* (2024.01)

(52) U.S. Cl.
CPC ........ *B60K 35/28* (2024.01); *B60K 2360/167* (2024.01)

(58) Field of Classification Search
CPC ........ B60K 2370/174; B60K 2370/188; B60K 2370/592; B60K 2370/785; Y02T 10/84; B60W 40/02; B60W 40/09; B60W 40/10; B60W 50/14

See application file for complete search history.

(56) References Cited

U.S. PATENT DOCUMENTS

| | | | |
|---|---|---|---|
| 6,282,492 | B1 | 8/2001 | Gorai et al. |
| 9,294,733 | B2 | 3/2016 | Watanabe et al. |
| 9,342,983 | B1 | 5/2016 | Brener et al. |
| 9,346,466 | B2 | 5/2016 | Papajewski et al. |
| 9,566,896 | B2 | 2/2017 | Armenta et al. |
| 9,604,648 | B2 | 3/2017 | Tamari et al. |
| 9,631,940 | B2 | 4/2017 | Eikelenberg et al. |
| 9,725,093 | B2 | 8/2017 | Chunodkar et al. |
| 9,818,088 | B2 | 11/2017 | Penilla et al. |
| 9,994,234 | B2 | 6/2018 | Oguri |
| 10,061,637 | B1 | 8/2018 | Halbersberg et al. |
| 10,176,783 | B2 | 1/2019 | Travers et al. |
| 10,269,260 | B2 | 4/2019 | Ellis |
| 10,495,477 | B2 | 12/2019 | Engelhardt |
| 10,504,052 | B2 | 12/2019 | Sugioka et al. |
| 10,594,991 | B1 | 3/2020 | Skolnick |
| 10,646,825 | B2 | 5/2020 | Kim |
| 10,930,159 | B1 | 2/2021 | Jessen et al. |
| 11,173,916 | B2 | 11/2021 | Dodo |
| 11,193,778 | B2 | 12/2021 | Verheijen et al. |
| 11,279,359 | B2 | 3/2022 | Plianos et al. |
| 11,390,165 | B2 | 7/2022 | Koebler et al. |
| 11,518,393 | B2 | 12/2022 | Liu et al. |
| 11,738,750 | B2 | 8/2023 | Wessel et al. |
| 11,760,208 | B2 | 9/2023 | Kwon |
| 2005/0154505 | A1 | 7/2005 | Nakamura et al. |
| 2007/0171093 | A1 | 7/2007 | Jang |
| 2008/0125958 | A1 | 5/2008 | Boss et al. |
| 2008/0133120 | A1 | 6/2008 | Romanick |
| 2009/0031741 | A1 | 2/2009 | Hara et al. |
| 2009/0281715 | A1 | 11/2009 | Paik |
| 2010/0057339 | A1 | 3/2010 | Pryakhin et al. |
| 2010/0253594 | A1 | 10/2010 | Szczerba et al. |
| 2010/0332373 | A1 | 12/2010 | Crabtree et al. |
| 2011/0166774 | A1 | 7/2011 | Schunder |
| 2011/0208646 | A1 | 8/2011 | McMaster et al. |
| 2011/0313647 | A1 | 12/2011 | Koebler et al. |
| 2012/0004839 | A1 | 1/2012 | Mizuno |
| 2012/0022781 | A1* | 1/2012 | Wilson ............... G01C 21/3469 701/410 |
| 2012/0089327 | A1 | 4/2012 | Miura et al. |
| 2012/0123657 | A1* | 5/2012 | Taguchi ............... B60W 50/14 701/93 |
| 2012/0271542 | A1 | 10/2012 | Arcot et al. |
| 2013/0054125 | A1 | 2/2013 | Bruemmer et al. |
| 2013/0173147 | A1 | 7/2013 | Takeuchi et al. |
| 2013/0261970 | A1 | 10/2013 | Papajewski et al. |
| 2014/0032062 | A1 | 1/2014 | Baer et al. |
| 2014/0032087 | A1 | 1/2014 | Shiri |
| 2015/0019117 | A1 | 1/2015 | Huber et al. |
| 2015/0073692 | A1* | 3/2015 | Malikopoulos ....... B60W 50/14 701/123 |
| 2015/0094968 | A1 | 4/2015 | Jia et al. |
| 2015/0183439 | A1 | 7/2015 | Jackson |
| 2015/0232097 | A1 | 8/2015 | Luther et al. |
| 2015/0241234 | A1 | 8/2015 | Ogawa |
| 2016/0084661 | A1 | 3/2016 | Gautama et al. |
| 2016/0129836 | A1 | 5/2016 | Sugita et al. |
| 2016/0207521 | A1 | 7/2016 | Ogawa |
| 2016/0221567 | A1 | 8/2016 | Ogawa |
| 2017/0008467 | A1 | 1/2017 | Lindhuber |
| 2017/0038219 | A1 | 2/2017 | Ziezold |
| 2017/0039870 | A1 | 2/2017 | Ellis |
| 2017/0146362 | A1 | 5/2017 | Bai |
| 2017/0307391 | A1 | 10/2017 | Mason et al. |
| 2018/0031380 | A1 | 2/2018 | Lee et al. |
| 2018/0079306 | A1 | 3/2018 | Kim et al. |
| 2018/0099564 | A1* | 4/2018 | Koebler ............... B60L 15/2045 |
| 2018/0113448 | A1 | 4/2018 | Nagda et al. |
| 2018/0186375 | A1 | 7/2018 | Meachair et al. |
| 2018/0222478 | A1 | 8/2018 | Limbacher |
| 2018/0244270 | A1 | 8/2018 | Tudosie |
| 2018/0345885 | A1 | 12/2018 | Seger et al. |
| 2018/0356835 | A1 | 12/2018 | Gehring et al. |
| 2019/0017840 | A1 | 1/2019 | Okamoto et al. |
| 2019/0152474 | A1 | 5/2019 | Sogabe |
| 2019/0164451 | A1 | 5/2019 | Gaither et al. |
| 2019/0170527 | A1 | 6/2019 | Inoue et al. |
| 2019/0236959 | A1 | 8/2019 | Belapurkar et al. |
| 2019/0248359 | A1 | 8/2019 | Miller et al. |
| 2019/0283584 | A1* | 9/2019 | Koebler ............... B60W 30/188 |
| 2019/0359211 | A1 | 11/2019 | Matsumoto et al. |
| 2020/0108829 | A1 | 4/2020 | Bauer |
| 2020/0122588 | A1 | 4/2020 | Cserna et al. |
| 2020/0191588 | A1 | 6/2020 | Park |
| 2020/0361476 | A1 | 11/2020 | Gaither et al. |
| 2020/0391593 | A1 | 12/2020 | Lee et al. |
| 2021/0185608 | A1 | 6/2021 | Ali et al. |
| 2021/0192975 | A1 | 6/2021 | Spence et al. |
| 2021/0213948 | A1 | 7/2021 | Lahti et al. |
| 2021/0269029 | A1 | 9/2021 | Fendt |
| 2021/0294351 | A1 | 9/2021 | Wiberg |
| 2021/0387525 | A1* | 12/2021 | Gruenig ............... B60W 50/14 |
| 2021/0403082 | A1 | 12/2021 | Funke et al. |
| 2022/0073070 | A1 | 3/2022 | Niewiadomski |
| 2022/0089024 | A1 | 3/2022 | Aoyama |
| 2022/0250543 | A1 | 8/2022 | Szczerba et al. |
| 2022/0363129 | A1* | 11/2022 | Pankov ............... B60K 35/00 |
| 2022/0363130 | A1* | 11/2022 | Pankov ............... B60K 35/29 |
| 2022/0371580 | A1 | 11/2022 | Kusumoto et al. |
| 2023/0280174 | A1 | 9/2023 | Pankov |

FOREIGN PATENT DOCUMENTS

| | | |
|---|---|---|
| EP | 2614997 | 7/2013 |
| FR | 2811440 | 1/2002 |
| JP | 2001124575 | 5/2001 |
| JP | 2012208829 | 10/2012 |
| JP | 2015132613 | 7/2015 |
| KR | 101526431 | 6/2015 |
| RU | 2407060 | 12/2010 |
| RU | 2436163 | 12/2011 |
| RU | 2523192 | 7/2014 |
| RU | 2548649 | 4/2015 |
| RU | 2015103750 | 8/2016 |
| RU | 2681506 | 3/2019 |
| RU | 2741818 | 1/2021 |
| RU | 2764469 | 1/2022 |
| RU | 2764741 | 1/2022 |
| RU | 2765268 | 1/2022 |
| WO | 2010074668 | 7/2010 |
| WO | 2012039405 | 3/2012 |

OTHER PUBLICATIONS

Egor Kulik et al.: ""Estimation of the requirements for hybrid electric powertrain based on analysis of vehicle trajectory using GPS and accelerometer data"", 2018: https://ieeexplore.ieee.org/abstract/document/8321394.

(56) References Cited

OTHER PUBLICATIONS

Camiel J.J.Beckers et al.: ""Assessing the impact of cornering losses on the energy consumption of electric city buses"", 2020, https://www.sciencedirect.com/science/article/pii/S1361920920305472.
Irfan Ullah et al.: ""Electric vehicle energy consumption prediction using stacked generalization: an ensemble learning approach"", Feb. 26, 2021, https://www.tandfonline.com/doi/abs/10.1080/15435075.2021.1881902.
Bozorgi Amier et al.: ""A Time and Energy Efficient Routing Algorithm for Electric Vehicles Based on Historical Driving Data"", Nov. 2017, https://www.researchgate.net/publication/320953773_A_Time_and_Energy_Efficient_Routing_Algorithm_for_Electric_Vehicles_Based_on_Historical_Driving_Data.
Various Search Reports from the Russian Federal Institute of Industrial Property (with English translations).
International Search Report for PCT/RU2020/050189.
International Search Report for PCT/RU2022/050064.
International Search Report for PCT/RU2022/050065.
International Search Report for PCT/RU2022/050066.
International Search Report for PCT/RU2022/050067.
International Search Report for PCT/RU2022/050110.
International Search Report for PCT/RU2022/050111.
International Search Report for PCT/RU2022/050112.
International Search Report for PCT/RU2022/050113.
International Search Report for PCT/RU2022/050125.
International Search Report for PCT/RU2022/050126.
International Search Report for PCT/RU2022/050176.
International Search Report for PCT/RU2022/050221.
International Search Report for PCT/RU2022/050234.
International Search Report for PCT/RU2022/050241.
International Search Report for PCT/RU2022/050242.
International Search Report for PCT/RU2022/050245.
International Search Report for PCT/RU2022/050246.
International Search Report for PCT/RU2022/050294.
International Search Report for PCT/RU2022/050295.
International Search Report for PCT/RU2022/050360.
International Search Report for PCT/RU2022/050361.
International Search Report for PCT/RU2022/050362.
International Search Report for PCT/RU2022/050363.
International Search Report for PCT/RU2022/050364.
International Search Report for PCT/RU2022/050399.
International Search Report for PCT/RU2022/050400.
International Search Report for PCT/RU2022/050401.
International Search Report for PCT/RU2022/050402.
Written Opinion of the International Searching Authority for PCT/RU2020/050189 (English translation).
Written Opinion of the International Searching Authority for PCT/RU2022/050064.
Written Opinion of the International Searching Authority for PCT/RU2022/050065.
Written Opinion of the International Searching Authority for PCT/RU2022/050066.
Written Opinion of the International Searching Authority for PCT/RU2022/050067.
Written Opinion of the International Searching Authority for PCT/RU2022/0500110.
Written Opinion of the International Searching Authority for PCT/RU2022/0500111.
Written Opinion of the International Searching Authority for PCT/RU2022/0500112.
Written Opinion of the International Searching Authority for PCT/RU2022/0500113.
Written Opinion of the International Searching Authority for PCT/RU2022/0500125.
Written Opinion of the International Searching Authority for PCT/RU2022/0500126.
Written Opinion of the International Searching Authority for PCT/RU2022/0500176.
Written Opinion of the International Searching Authority for PCT/RU2022/0500221.
Written Opinion of the International Searching Authority for PCT/RU2022/0500234.
Written Opinion of the International Searching Authority for PCT/RU2022/0500241.
Written Opinion of the International Searching Authority for PCT/RU2022/0500242.
Written Opinion of the International Searching Authority for PCT/RU2022/0500245.
Written Opinion of the International Searching Authority for PCT/RU2022/0500246.
Written Opinion of the International Searching Authority for PCT/RU2022/0500294.
Written Opinion of the International Searching Authority for PCT/RU2022/0500295.
Written Opinion of the International Searching Authority for PCT/RU2022/0500360.
Written Opinion of the International Searching Authority for PCT/RU2022/0500361.
Written Opinion of the International Searching Authority for PCT/RU2022/0500362.
Written Opinion of the International Searching Authority for PCT/RU2022/0500363.
Written Opinion of the International Searching Authority for PCT/RU2022/0500364.
Written Opinion of the International Searching Authority for PCT/RU2022/0500399.
Written Opinion of the International Searching Authority for PCT/RU2022/0500400.
Written Opinion of the International Searching Authority for PCT/RU2022/0500401.
Written Opinion of the International Searching Authority for PCT/RU2022/0500402.
European (EPO) Search Opinion for EP4026746.
Supplemental European (EPO) Search Report for EP4026746.
Gauthier, Porsche's Augmented Reality HUD Could Show The Ideal Racing Line and 'Ghost' Cars, Sep. 18, 2018, www.carscoops.com/2018/09/porches-augmented-reality-hud-show-ideal-racing-line-ghost-cars.
George, A Head-up Display For Your Car That Lets You Race Yourself, Oct. 27, 2014, www.wired.com/2014/10/hud-brings-ghost-cars-to-the-track.
GhostDash: Augmented Reality Ghost Car and HUD, Apr. 27, 2019, web.archive.org/web/20190427073619/https://www.kickstarter.com/projects/ghostdash/ghostdash-augmented-reality-ghost-car-and-hud.
Bozorgi, A Time and Energy Efficient Routing Algorithm for Electric Vehicles Based on Historical Driving Data, IEEE Transactions on Electric Vehicles, vol. 2 No. 4, Dec. 2017.

\* cited by examiner

USER DEVICE FOR GENERATING A GRAPHICAL USER INTERFACE

FIELD OF INVENTION

The proposed invention relates to methods for controlling energy consumption by a motor vehicle, and can be used in transportation industry.

BACKGROUND OF THE INVENTION

There is a known method for evaluating the fuel efficiency of a motor vehicle disclosed in patent KR101526431B1, published on 6 May 2015 on 12 sheets (D1). The method of D1 is implemented by a device for evaluating the fuel efficiency of a motor vehicle, the device comprising: a data collection unit that collects data on driving, as well status and identification data of a plurality of motor vehicles, including the first motor vehicle; a driving index calculator that calculates driving indexes of each motor vehicle based on their driving data; a means for extracting an analogous group that extracts a group of motor vehicles, which are similar to the first motor vehicle, from a plurality of motor vehicles, based on their driving indexes and status data; a means for fuel efficiency evaluation that evaluates the fuel efficiency of the first motor vehicle based on its driving data and identification data in the analogous group; and a means for controlling a motor vehicle that controls the method of steering the motor vehicle or the method for improving the driving of the first motor vehicle, based on the fuel efficiency evaluation. According to the invention, the fuel efficiency of a motor vehicle can be evaluated with precision taking into account driver's habits and the current condition of the vehicle. In addition, the method of steering the motor vehicle and the driving mode based on the assessment of the vehicle's fuel are provided to the driver, so that he/she can improve his/her driving efficiency and the efficiency of steering the motor vehicle, as well as reduce the cost of vehicle maintenance.

The method disclosed in D1 does not use the information on the specific portion of the route that was covered by the first motor vehicle, which reduces the accuracy of fuel consumption estimation. In addition, the method disclosed in D1 uses the information obtained from motor vehicles with similar specifications and similar driving mode only, which prevents the method from being used in a global fuel consumption control system comprising multiple motor vehicles with different specifications. In addition, the method disclosed in D1 is used to identify operational problems of motor vehicles that affect the fuel consumption levels and require certain vehicle parts to be repaired or replaced, and so this method cannot be used to change the motor vehicle driving mode in order to reduce the energy consumption on a given portion of the route. The method disclosed in D1 can be considered the closest prior art to the claimed invention. In addition, the known invention of D1 does not provide a convenient graphical user interface that is adapted to inform the user of the need to change the mode of movement or the steps of the method being performed.

BRIEF SUMMARY OF THE INVENTION

The technical problem to be solved by the claimed invention is to provide a user device that do not possess the drawbacks of the prior art and thus make it possible to generate an accurate energy-efficient track for a motor vehicle that allows to reduce energy consumption by the motor vehicle on the specific portion of the route, as well as to reliably signal about energy consumption by the motor vehicle and the ways of reducing its energy consumption.

The objective of the claimed invention is to overcome the drawbacks of the prior art and thus to reduce energy consumption by the motor vehicle on the specific portion of the route, as well as to monitor energy consumption by the motor vehicle and to enhance the accuracy of information on energy consumption by the motor vehicle.

The objective of the present invention is achieved by a user device for generating a graphical user interface (GUI), comprising at least: a display; a CPU; a memory that stores the program code that, when implemented, induces the CPU to perform the steps according to the method for generating a graphical user interface (GUI) comprising at least the following steps: detecting the current location of the vehicle in operation on the portion of the route and the current speed of the vehicle in operation on the portion of the route within the range of a pre-generated energy-efficient track for the vehicle in operation, wherein the energy-efficient track comprises at least an estimated location of the vehicle in operation on the portion of the route and an estimated speed of the vehicle in operation on the portion of the route that is associated with the estimated location of the vehicle in operation on the portion of the route; wherein the current speed of the vehicle in operation is determined for the current location of the vehicle in operation; and wherein the current location of the vehicle in operation on the portion of the route corresponds to its estimated location on the portion of the route; comparing the current speed of the vehicle in operation with the estimated speed of the vehicle in operation; generating a control signal for displaying the first graphical element that corresponds to a match between the current speed of the vehicle in operation and the estimated speed of the vehicle in operation; and displaying the second graphical element that corresponds to a mismatch between the current speed of the vehicle in operation and the estimated speed of the vehicle in operation; wherein the user device is adapted to receive at least the data containing the generated energy-efficient track for the vehicle in operation from a server of the system for generating a GUI; and wherein the user device is adapted to receive at least the data containing the current speed of the vehicle in operation from the motion control system.

BRIEF DESCRIPTION OF THE DRAWINGS

Exemplary embodiments of the present invention are described in further detail below with references made to the attached drawings, included herein by reference.

DETAILED DESCRIPTION OF THE INVENTION

Figure 1:
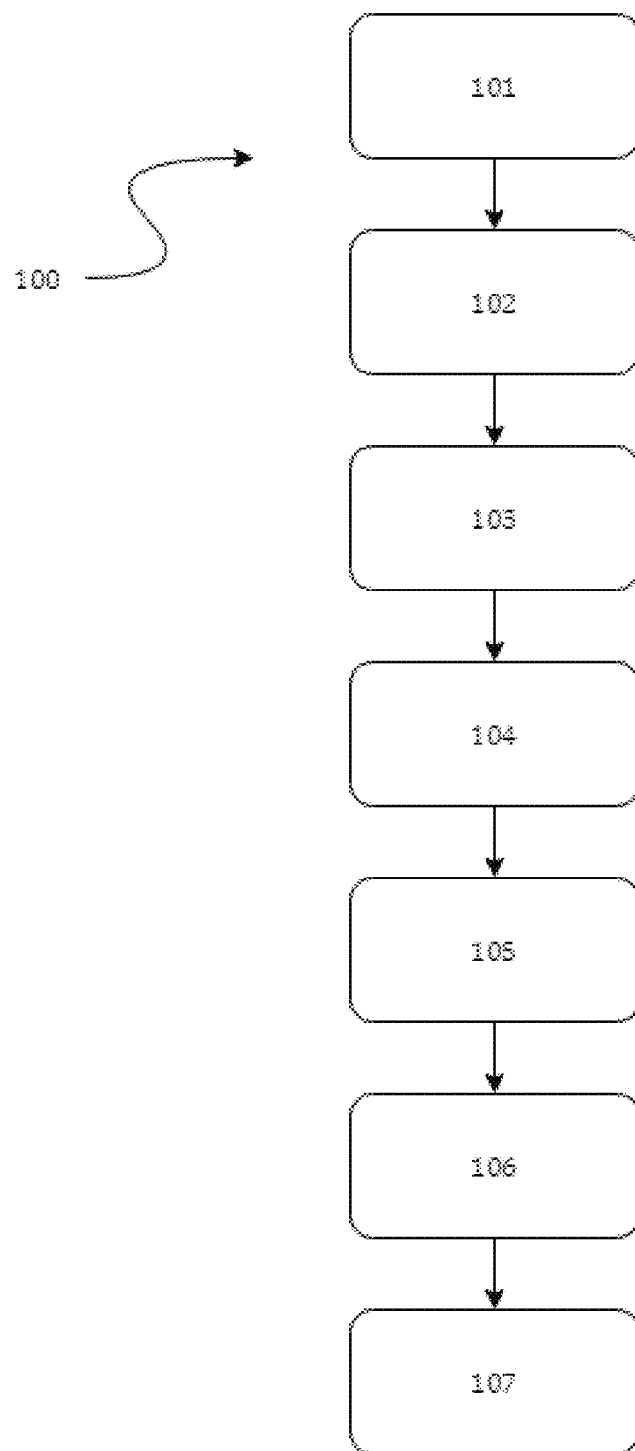
FIG. 1 illustrates an exemplary, non-limiting, diagram for the method 100 for generating an energy-efficient track for the motor vehicle.

According to a preferred embodiment of the present invention, there is provided a user device for generating a graphical user interface (GUI), comprising at least: a display; a CPU; a memory that stores the program code that, when implemented, induces the CPU to perform the steps according to the method for generating a graphical user interface (GUI) comprising at least the following steps: detecting the current location of the vehicle in operation on the portion of the route and the current speed of the vehicle in operation on the portion of the route within the range of a pre-generated energy-efficient track for the vehicle in operation, wherein the energy-efficient track comprises at least an estimated location of the vehicle in operation on the portion of the route and an estimated speed of the vehicle in operation on the portion of the route that is associated with the estimated location of the vehicle in operation on the portion of the route; wherein the current speed of the vehicle in operation is determined for the current location of the vehicle in operation; and wherein the current location of the vehicle in operation on the portion of the route corresponds to its estimated location on the portion of the route; comparing the current speed of the vehicle in operation with the estimated speed of the vehicle in operation; generating a control signal for displaying the first graphical element that corresponds to a match between the current speed of the vehicle in operation and the estimated speed of the vehicle in operation; and displaying the second graphical element that corresponds to a mismatch between the current speed of the vehicle in operation and the estimated speed of the vehicle in operation; wherein the user device is adapted to receive at least the data containing the generated energy-efficient track for the vehicle in operation from a server of the system for generating a GUI; and wherein the user device is adapted to receive at least the data containing the current speed of the vehicle in operation from the motion control system.

In an alternative embodiment of the present invention, there is provided a user device characterized in that the pre-generated energy-efficient track for the vehicle in operation is obtained by means of the CPU of the server implementing the method for generating an energy-efficient track for the motor vehicle, the method comprising the following steps: collecting primary data that involves obtaining data associated with the first motor vehicle, data associated with the portion of the route to be passed by the first motor vehicle, and data associated with the vehicle in operation, wherein the vehicle in operation passes the portion of the route after the first motor vehicle; collecting secondary data that involves generating a track of the first motor vehicle, wherein said track is generated based on how the first motor vehicle passed the portion of the route; and generating an energy-efficient track for the vehicle in operation, wherein the energy-efficient track for the vehicle in operation is generated based on the track generated for the first motor vehicle; and wherein the generated energy-efficient track comprises at least an estimated location of the motor vehicle on the portion of the route and an estimated speed of the motor vehicle on the portion of the route that is associated with the estimated location of the motor vehicle on the portion of the route.

In an alternative embodiment, there is provided a user device, wherein the pre-generated energy-efficient track for the vehicle in operation further contains the estimated state of the speed control element of the vehicle in operation, the speed control element being or selected from one of the following: an accelerator pedal of the vehicle in operation, a brake pedal of the vehicle in operation, a retarder of the vehicle in operation, an intarder of the vehicle in operation, a compression brake of the vehicle in operation, a decompression brake of the vehicle in operation, or a gearbox of the vehicle in operation, or a combination thereof; wherein the estimated state of the speed control element of the vehicle in operation corresponds to the estimated speed of the vehicle in operation, associated with the estimated location of the vehicle in operation on the portion of the route; wherein the method implemented by the CPU of the user device further comprises the following steps: determining the current state of the speed control element of the vehicle in operation, the speed control element being or selected from one of the following: an accelerator pedal of the vehicle in operation, a brake pedal of the vehicle in operation, a retarder of the vehicle in operation, an intarder of the vehicle in operation, a compression brake of the vehicle in operation, a decompression brake of the vehicle in operation, or a gearbox of the vehicle in operation, or a combination thereof; wherein the current state of the speed control element of the vehicle in operation corresponds to the current speed of the vehicle in operation, associated with the current location of the vehicle in operation; and comparing the current state of the speed control element of the vehicle in operation with its estimated state, wherein the step of generating a control signal for displaying the first graphical element that corresponds to a match between the current speed of the motor vehicle and the estimated speed of the motor vehicle and displaying the second graphical element that corresponds to a mismatch between the current speed of the motor vehicle and the estimated speed of the motor vehicle involves generating a control signal to display the third graphical element that corresponds to a match between the current state of the speed control element of the vehicle in operation and its estimated state and also involves generating a control signal to display the fourth graphical element that corresponds to a mismatch between the current state of the speed control element of the vehicle in operation and its estimated state.

In an exemplary embodiment of the present invention, there is provided a user device, wherein the pre-generated energy-efficient track further comprises a speed profile of the moving motor vehicle, wherein the speed profile comprises the first preferred speed range for the vehicle in operation within the portion of the route.

In an alternative embodiment of the present invention, there is provided a user device characterized in that the first graphical element comprises a first GUI element, which is a visually bounded area, wherein its boundaries are determined in accordance with the boundaries of the first preferred speed range for the vehicle in operation within the given portion of the route, and wherein its boundaries of are not the boundaries of the display screen area; a second GUI element, which is a graphic symbol displayed on the screen, wherein the position of the second GUI element on the screen conforms to the current speed of the vehicle in operation, which is within the first preferred speed range for the vehicle in operation within the given portion of the route, and wherein the second GUI element is displayed within the area of the first GUI element; and the device is further characterized in that the second graphical element comprises a first GUI element, which is a visually bounded area, wherein its boundaries are determined in accordance with the boundaries of the first preferred speed range for the vehicle in operation within the given portion of the route, and wherein its boundaries of are not the boundaries of the display screen area; a third GUI element, which is a graphic symbol displayed on the screen, wherein the position of the third GUI element on the screen conforms to the current speed of the vehicle in operation, which is outside the first preferred speed range for the vehicle in operation within the given portion of the route, and wherein the third GUI element is displayed outside the area of the first GUI element or on its boundary.

In an alternative embodiment of the present invention, there is provided a user device characterized in that the method implemented by the server's CPU further comprises a step of generating an adjustment energy-efficient track for the vehicle in operation, wherein the adjustment energy-efficient track is generated based on the energy-efficient track for the vehicle in operation, and wherein the step of generating an adjustment energy-efficient track comprises at least the following steps: determining the current location of the vehicle in operation, wherein the current location of the vehicle in operation does not correspond to its estimated location on the portion of the route; determining an adjustment portion of the route, wherein its start coordinates match the current location of the vehicle in operation and its end coordinates match the start coordinates of the portion of the route, for which the main energy-efficient track for the vehicle in operation was generated, and wherein the start coordinates of the portion of the route, for which the main energy-efficient track for the vehicle in operation was generated, are located in the vehicle in operation's direction of movement; collecting primary adjustment data, which involves obtaining data associated with the vehicle in operation and data associated with the adjustment portion of the route; and generating an adjustment energy-efficient track for the vehicle in operation, wherein the adjustment energy-efficient track for the vehicle in operation contains at least an estimated speed profile of the vehicle in operation on the adjustment portion of the route, and wherein the estimated speed profile of the vehicle in operation contains the second preferred speed range for the vehicle in operation generated in such a way that when the vehicle in operation is moving at any of the speeds from the second preferred speed range, its speed at the start coordinates of the portion of the route, for which the main energy-efficient track for the vehicle in operation was generated, matches any of the speeds from the first preferred speed range for the vehicle in operation.

In an alternative embodiment, there is provided a user device, characterized in that the first graphical element comprises a first GUI element, which is a visually bounded area, wherein its boundaries are determined in accordance with the boundaries of the first preferred speed range for the vehicle in operation within the given portion of the route, and wherein its boundaries of are not the boundaries of the display screen area; a second GUI element, which is a graphic symbol displayed on the screen, wherein the position of the second GUI element on the screen conforms to the current speed of the vehicle in operation, which is within the first preferred speed range for the vehicle in operation within the given portion of the route, and wherein the second GUI element is displayed within the area of the first GUI element; and the user device is further characterized in that the second graphical element comprises a fourth GUI element, which is a visually bounded area, wherein its boundaries are determined in accordance with the boundaries of the second preferred speed range for the vehicle in operation within the adjustment portion of the route, and wherein the boundaries of said area are not the boundaries of the display screen area; a fifth GUI element, which is a graphical symbol displayed on the screen, wherein the position of the fifth GUI element on the screen conforms to the current speed of the vehicle in operation, which is within the second preferred speed range for the vehicle in operation within the adjustment portion of the route, and wherein the fifth GUI element is displayed within the area of the fourth GUI element; and a sixth GUI element, which is a graphical symbol displayed on the screen, wherein the position of the sixth GUI element on the screen conforms to the current speed of the vehicle in operation, which is outside the second preferred speed range for the vehicle in operation within the adjustment portion of the route, and wherein the sixth GUI element is displayed outside the area of the fourth GUI element or on its boundary.

In an alternative embodiment, there is provided a user device, wherein the first graphical element and the second graphical element have different colors.

In an alternative embodiment, there is provided a user device, which is a vehicle dashboard.

In an alternative embodiment, there is provided a user device, which is a device for projecting visual information onto the windshield of the motor vehicle.

In an alternative embodiment, there is provided a user device, which is a device for projecting visual information onto a head-up display (HUD).

In an alternative embodiment, there is provided a user device, which is a head unit of the motor vehicle.

In an alternative embodiment, there is provided a user device, wherein its display is a HUD.

Additional alternative embodiments of the present invention are provided below. This disclosure is in no way limiting to the scope of protection granted by the present patent. Rather, it should be noted that the claimed invention can be implemented in different ways, so as to include different components and conditions, or combinations thereof, which are similar to the components and conditions disclosed herein, in combination with other existing and future technologies.

FIG. 1 illustrates an exemplary, non-limiting, diagram for the method 100 for generating an energy-efficient track for the motor vehicle. Preferably, but not limited to, the method 100 comprises the following steps: an optional step 101 of generating an estimated track for the first motor vehicle; an optional step 102 of adjusting the estimated track for the first motor vehicle; a step 103 of evaluating the passing of a portion of the route by the first motor vehicle; a step 104 of generating an estimated track for the vehicle in operation; an optional step 105 of adjusting the estimated track for the vehicle in operation; an optional step 106 of evaluating the passing of a portion of the route by the vehicle in operation; an optional step 107 of generating a track database. Preferably, but not limited to, the motor vehicle is any conventional motor vehicle, such as, but not limited to, a wheeled vehicle or a tracked vehicle, wherein the vehicle has to comprise at least one engine that consumes energy to actuate at least one moving device of the vehicle, such as, but not limited to, the wheels. The energy consumed by the engine is, for example, but not limited to, the energy produced by burning a fuel (in case the motor vehicle is equipped with an internal combustion engine), by electricity (in case the motor vehicle is equipped with an electric motor), or by a combination thereof (in case the motor vehicle is a hybrid vehicle). The first motor vehicle is a motor vehicle that passes the portion of the route first. The vehicle in operation is a motor vehicle that passes portion of the route later than the first motor vehicle. While some of the methods disclosed below are intended to be implemented as part of the motion control system of the vehicle in operation, or in connection thereto, it should be obvious to a person having ordinary skill in the art that the disclosed methods may also be implemented as part of systems or devices that are not connected to the vehicle in operation or are indirectly connected to it, as well as in computer simulations. Preferably, but not limited to, the motor vehicles are controlled via a corresponding motor vehicle control system that comprises a set of interconnected units and components configured so that the motor vehicle can be controlled by an operator, i.e. a driver, an autonomous control system, a remote user, or a remote control system, in order to drive the motor vehicle, to stop its movement, to change the direction of its movement, to change its speed, etc. Motor vehicle control systems are widely known, and therefore are not described any further, however, preferably, but not limited to, the claimed motor vehicle control system has to comprise a speed control element of the motor vehicle, the component being one of the following or any suitable combination thereof: an accelerator pedal of the vehicle in operation, a brake pedal of the vehicle in operation, a retarder of the vehicle in operation, an intarder of the vehicle in operation, a compression brake of the vehicle in operation, a decompression brake of the vehicle in operation, or a gearbox of the vehicle in operation. Preferably, but not limited to, these elements, as well as other components of the motion control system should be equipped with a variety of sensors (such as, but not limited to, contact and contactless position sensors, encoders, induction sensors, magnetoresistive sensors, volumetric flow meters, capacitive sensors, oxygen sensors, nitrogen oxide sensors, temperature sensors, pressure sensors, knock sensors, oil level sensors, light level sensors, rain sensors, as well as various environmental sensors, such as, but not limited to, radars, lidars, cameras, global positioning sensors, odometry sensors, gyrostabilizers) allowing to read the state of each component at any given moment in time, to locate the motor vehicle at any given moment in time, and to read its technical status and other parameters at any given moment in time. Preferably, but not limited to, the sensors have to be adapted to digital data output. These sensors, as well as the methods for obtaining useful information from them, are widely known in the art, and therefore are not described in further detail. Preferably, but not limited to, the motor vehicle control system further comprises any kind of electronic devices capable of computation, such as a vehicle dashboard; a device for projecting visual information onto the windshield of the motor vehicle; a device for projecting visual information onto a head-up display (HUD); a head unit; a user device, also a wearable user device, for receiving and transmitting data (e.g. a transceiver), and for producing a GUI (e.g. a dashboard display); a display of the device for projecting visual information onto the windshield of the motor vehicle; a HUD of the device for projecting visual information onto a head-up display (HUD); a display of the head unit; a display of the user device, also a HUD of the wearable user device; a device for producing audio signals (e.g. speakers). Preferably, but not limited to, the electronic devices capable of computation comprise at least a CPU and a memory that stores the program code that, when implemented, induces the CPU to perform the steps according to some method performed by the CPU. For example, but not limited to, the CPU and memory may be the main CPU and memory of the motor vehicle control system implemented as a central controller. Preferably, but not limited to, the vehicle dashboard comprises the aforementioned CPU and memory, and/or communicates with the aforementioned central controller. Preferably, but not limited to, the device for projecting visual information onto the windshield of the motor vehicle comprises the aforementioned CPU and memory, and/or communicates with the aforementioned central controller. Preferably, but not limited to, the device for projecting visual information onto a HUD comprises the aforementioned CPU and memory, and/or communicates with the aforementioned central controller. Preferably, but not limited to, the head unit of the motor vehicle comprises the aforementioned CPU and memory, and/or communicates with the aforementioned central controller. Preferably, but not limited to, the user device communicates with the motor vehicle control system via conventional data exchange protocols and comprises the aforementioned CPU and memory, and/or communicates with the aforementioned central controller via conventional data exchange protocols. For example, but not limited to, the user device may be represented by a smartphone, a PDA, a tablet, a netbook, a laptop, etc. For example, but not limited to, the user device may be represented by a wearable user device, such as, for instance, a wearable display device as disclosed by the patent U.S. Ser. No. 10/176,783B2 or a similar one. When the user device is a wearable user device, it should be preferably, but not limited to, equipped by a HUD capable of displaying visual information. Preferably, but not limited to, the aforementioned dashboard, head unit, and the device for projecting visual information onto the windshield of the motor vehicle should comprise a corresponding display capable of visual information output, or be somehow connected to such display. Preferably, but not limited to, the aforementioned device for projecting visual information onto a HUD should comprise a corresponding HUD capable of visual information output, or be somehow connected to such display. Preferably, but not limited to, the visual information to be displayed comprises at least the result of the methods for generating a GUI being implemented by the CPUs of computer devices as disclosed herein. Preferably, but not limited to, the computer devices mentioned in the present disclosure are generally any suitable computer devices that comprise at least a CPU and a memory, particularly, but not limited to, the claimed electronic devices capable of computation, the user device and the server of the system for generating a GUI. Preferably, but not limited to, the control system of the motor vehicle may be connected via a transceiver with the user device, the server of the system for generating a GUI, the server of the system for generating the energy-efficient track, other servers and control systems of other motor vehicles, but not limited to.

Preferably, but not limited to, the portion of the route is a portion of the route with special properties. A route is, but not limited to, a strip of land adapted to be passable by motor vehicles, wherein the route may comprise, but not limited to, a road, a junction, an intersection, etc. A road may be, but not limited to, a paved road or a dirt road. Preferably, but not limited to, the special properties of the portion of the route may comprise at least one of the following: the geometry of the portion of the route, the road grade of the portion of the route, the allowed speed on the portion of the route, the quality of road surface of the portion of the route, speed limits on the portion of the route, turns on the portion of the route, weather conditions on the portion of the route at the moment it is passed by a motor vehicle, the infrastructure of the portion of the road, or a combination thereof. For example, but not limited to, the special properties of the portion of the route may be marked by acceleration points and/or deceleration points. In addition, but not limited to, a deceleration point may be a point on the portion of the route, in which the momentum of the motor vehicle is sufficient to cover the distance to an acceleration point on the portion of the route. In addition, but not limited to, a deceleration point may be a point on the portion of the route, in which the motor vehicle has to be given negative or zero acceleration in order to smoothly reach the acceleration point, wherein the negative acceleration may be such that the motor vehicle has zero momentum at the acceleration point. In addition, but not limited to, an acceleration point may be a point on the portion of the route, in which the motor vehicle continues to move with negative acceleration. In addition, but not limited to, an acceleration point may be a point on the portion of the route, in which the motor vehicle has zero momentum. For example, but not limited to, a portion of the route may comprise a road with a slope and an upslope that follows it, wherein the beginning of the slope may be marked by a deceleration point, and an acceleration point may be placed within the upslope.

Figure 2:
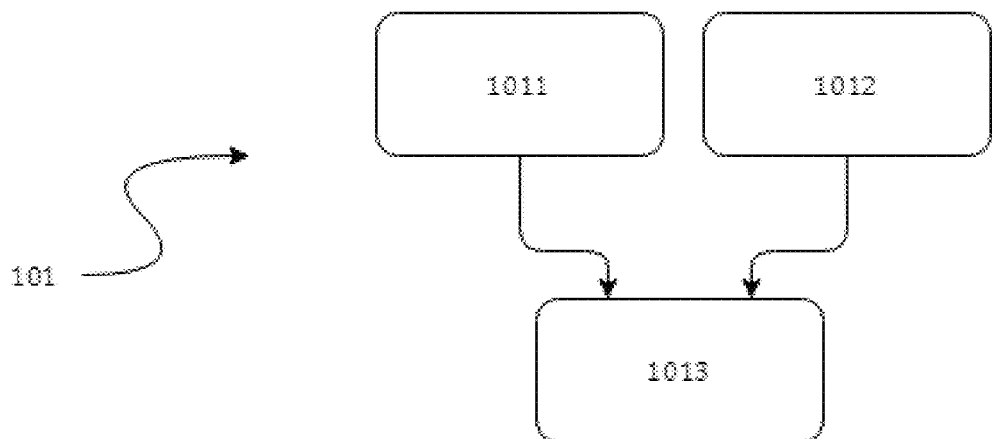
FIG. 2 illustrates an exemplary, non-limiting, diagram for the step 101 of generating an estimated track for the first motor vehicle.

As shown in FIG. 2, the optional step 101 of generating an estimated track for the first motor vehicle, for example, but not limited to, comprises the following steps: a step 1011 of identifying the first motor vehicle; a step 1012 of identifying the portion of the route; and a step 1013 of generating an estimated track for the first motor vehicle. For example, but not limited to, the step 1011 involves determining the first motor vehicle and the data associated with it. Such data may include, for example, but not limited to, at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof. In general, it should be noted that such data may be used to generate an estimated speed profile of the first motor vehicle on a given portion of the route. The step 1011 further involves determining the location of the first motor vehicle relative to the portion of the route that is identified in the step 1012. In addition, for example, but not limited to, the step 1012 involves determining the first portion of the route along the direction of movement of the first motor vehicle, relative to its location. The step 1012 further involves determining the special properties of the portion of the route, which are data associated with the portion of the route to be passed by the first motor vehicle. In general, it should be noted that the data about the special properties of the portion of the route may be used to generate an estimated speed profile of the first motor vehicle on this portion of the route. In addition, for example, but not limited to, the step 1013 involves generating an estimated track for the first motor vehicle on the portion of the route using the data associated with the first motor vehicle and the data associated with the portion of the route to be passed by the first motor vehicle. Therefore, the generated estimated track for the first motor vehicle contains both the data associated with the first motor vehicle and the data associated with the portion of the route to be passed by the first motor vehicle. Preferably, but not limited to, the generated estimated track for the first motor vehicle further contains the estimated speed profile of the first motor vehicle, which, in turn, contains at least estimated locations of the first motor vehicle on the portion of the route and estimated speeds of the first motor vehicle on the portion of the route associated with said estimated locations. The estimated speed profile of the first motor vehicle further contains, but not limited to, estimated states of the speed control element of the first motor vehicle, which is one of the following: the accelerator pedal of the first motor vehicle, its brake pedal, its retarder, its intarder, its compression brake, decompression brake, its gearbox, or a combination thereof; wherein the state of the speed control element, according to the present disclosure, comprises the positions of the moving parts of the corresponding control element in its active state, i.e. relative to the state, in which the corresponding element is not activated, and/or any other active state of the element, and/or any other non-active state of the element; and wherein the estimated states of the control element are also associated with the corresponding estimated location of the motor vehicle on the portion of the route. Subsequently, the first motor vehicle moves along the given portion of the route in accordance with the estimated track for the first motor vehicle, wherein it is assumed that the estimated track is energy efficient. A motor vehicle track can be considered energy efficient in case both the time spent by the motor vehicle to pass the portion of the route and the energy consumed by the motor vehicle to pass the portion of the route are minimal. However, it should be obvious to a person having ordinary skill in the art that the estimated track for the first motor vehicle, generated in step 101, may be also generated using alternative ways.

Figure 3:
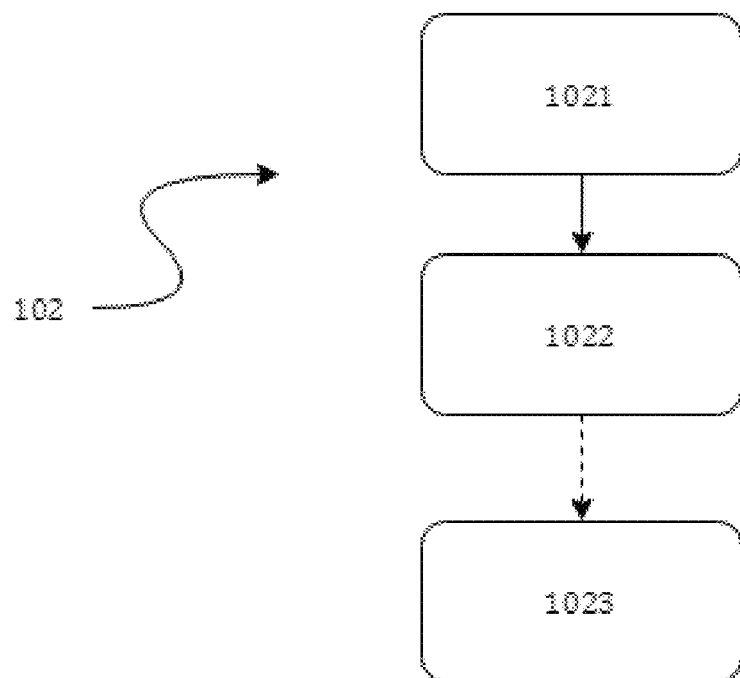
FIG. 3 illustrates an exemplary, non-limiting, diagram for the step 102 of adjusting the estimated track for the first motor vehicle.

As shown in FIG. 3, the optional step 102 of adjusting the estimated track for the first motor vehicle, for example, but not limited to, comprises the following steps: a step 1021 of determining the actual speed profile of the first motor vehicle in at least one of the moments when it passes the portion of the route; a step 1022 of comparing the actual speed profile with the corresponding estimated speed profile from the estimated track for the first motor vehicle; and, if necessary, a step 1023 of adjusting the actual speed profile in response to the results of said comparison. For example, but not limited to, the step 1021 involves determining the location of the first motor vehicle on the portion of the route, together with at least a single wheel speed of the first motor vehicle in the specified moment in time. In addition, for example, but not limited to, the step 1022 involves determining the estimated wheel speed of at least a single wheel of the first motor vehicle in the specified moment in time, as well as matching the actual wheel speed and the estimated wheel speed. In addition, for example, but not limited to, in case the actual wheel speed differs from the estimated wheel speed, an energy consumption control signal is generated for the first motor vehicle in step 1023. This energy consumption control signal, for example, but not limited to, contains a control signal for the motion control system of the first motor vehicle, which changes the operation of the engine, and/or the brake system, and/or other technical components of the first motor vehicle, so that the actual wheel speed matches the estimated wheel speed in the specified moment in time. However, it should be obvious to a person having ordinary skill in the art that although the adjustment of the estimated track for the first motor vehicle enhances the accuracy of the subsequent generation of the energy-efficient track for the vehicle in operation thus allowing to reduce energy consumption by the vehicle in operation on a specific portion of the route, said adjustment is optional, since the actual track of the first motor vehicle, which is generated according to the method described below, may be sufficient for generating an accurate energy-efficient track for the vehicle in operation.

Figure 4:
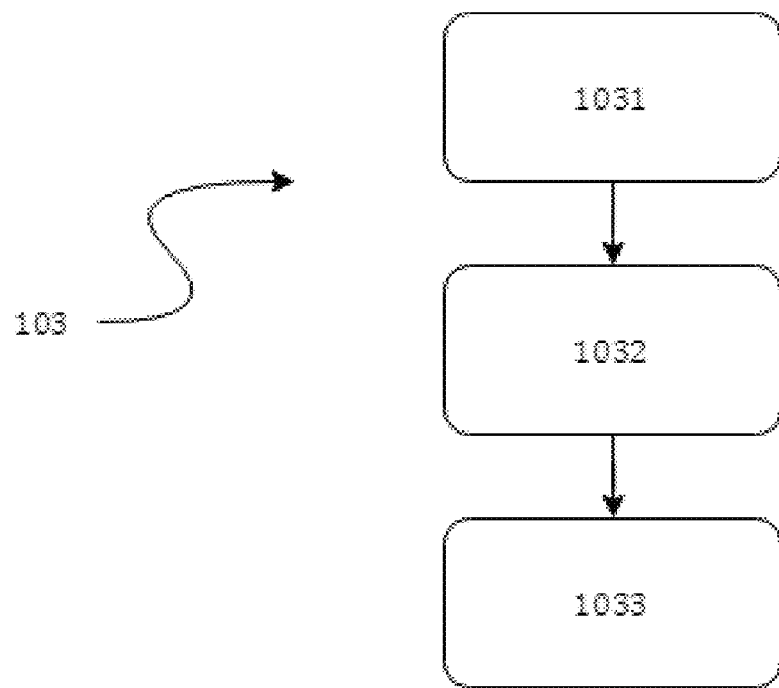
FIG. 4 illustrates an exemplary, non-limiting, diagram for the step 103 of evaluating the passing of a portion of the route by the first motor vehicle.

As shown in FIG. 4, the step 103 of evaluating the passing of a portion of the route by the first motor vehicle, which is also a step of collecting secondary data, comprises, but not limited to, the following steps: a step 1031 of collecting secondary data associated with the first motor vehicle and/or secondary data associated with the portion of the route passed by the first motor vehicle; a step 1032 of generating a track for the first motor vehicle; and a step 1033 of evaluating energy efficiency of the track of the first motor vehicle. For example, but not limited to, the step 1031 of collecting secondary data involves determining the fact of passing the portion of the route by the first motor vehicle, for example, but not limited to, based on the location of the first motor vehicle relative to the boundaries of the portion of the route, as well as (optionally) refining the data associated with the first motor vehicle and/or the portion of the route. In general, it should be noted that, in this step, the actual data associated with the first motor vehicle and/or the portion of the route it has passed are collected. In general, it should be noted that such data may be used to generate the actual track of the first motor vehicle, based on how it passed a given portion of the route. It should also be noted that refined data associated with the first motor vehicle and/or the portion of the route can be used to evaluate energy efficiency of the track generated for the first motor vehicle. In addition, for example, but not limited to, the step 1032 is the same as the step 1012, apart from the fact that the secondary data collected in step 1031 can be used to generate a track for the first motor vehicle along with the primary data associated with the first motor vehicle and/or the portion of the route. Thus, the actual track for the first motor vehicle generated in step 1032 also contains the actual data associated with the first motor vehicle, including, but not limited to, the actual speed profile of the first motor vehicle on the portion of the route and the actual data associated with the portion of the route. In addition, but not limited to, the actual speed profile of the first motor vehicle contains, but not limited to, actual locations of the first motor vehicle on the portion of the route and its actual speeds on the portion of the route that are associated with its actual locations on the portion of the route, as well as actual states of the speed control elements of the first motor vehicle, which are also associated with its actual locations on the portion of the route. In addition, for example, but not limited to, the step 1033 involves evaluating energy efficiency of the track generated for the first motor vehicle. In general, it should be noted that the track generated for the first motor vehicle will be considered energy efficient in case both the time spent by the first motor vehicle to pass the portion of the route and the energy consumed by the first motor vehicle to pass the portion of the route are minimal. Thus, it should be noted that, in step 1033, energy efficiency of the estimated track for the first motor vehicle is compared to that of the track generated for the first motor vehicle. It should also be noted that in case the track generated for the first motor vehicle is more energy-efficient than the estimated track for the first motor vehicle, then the estimated track for the vehicle in operation is generated using the generated (actual) track, even if it is different from the estimated track for the first motor vehicle. Otherwise, it should be noted that the estimated track for the vehicle in operation is also generated based on the actual track for the first motor vehicle, taking into account the secondary data associated with the first motor vehicle and/or the portion of the route passed by it. In addition, the estimated track for the first motor vehicle can also be adjusted based on how the first motor vehicle passed the given portion of the route, using the refined data associated with the first motor vehicle and/or the portion of the route. In this case, energy efficiency of the adjusted estimated track for the first motor vehicle is evaluated. In general, it should be noted that the estimated track to be generated for the vehicle in operation has to be energy efficient, and it has to be generated taking into account the properties of the actual track of the first motor vehicle. However, it should be obvious to a person having ordinary skill in the art that the estimated track for the first motor vehicle, as was mentioned above, can be any estimated track for the first motor vehicle that contains the data associated with the first motor vehicle and the data associated with the portion of the route to be passed by the first motor vehicle, including, but not limited to, the estimated track for the first motor vehicle that was adjusted in step 102.

Figure 5:
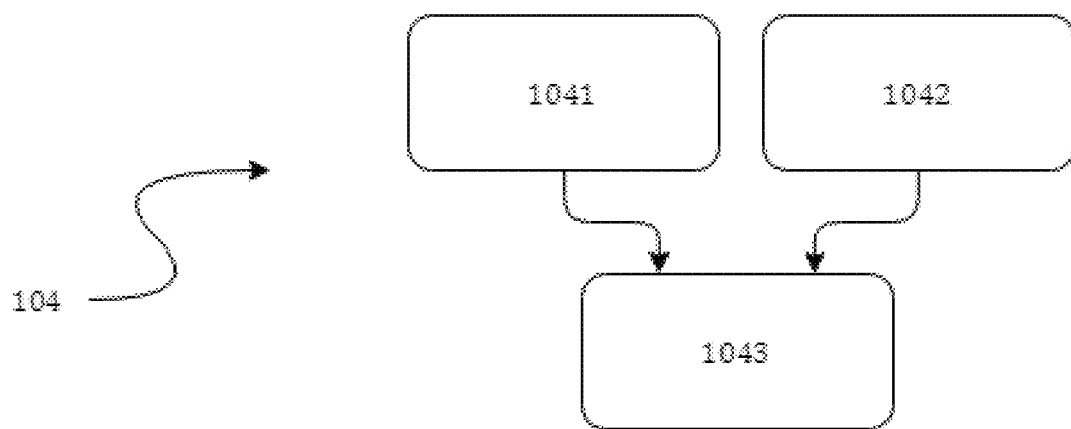
FIG. 5 illustrates an exemplary, non-limiting, diagram for the step 104 of generating an estimated track for the second motor vehicle.

As shown in FIG. 5, the step 104 of generating an estimated track for the vehicle in operation comprises the following steps: a step 1041 of identification the first motor vehicle; a step 1042 of identifying the portion of the route; and a step 1043 of generating an estimated track for the first motor vehicle. For example, but not limited to, the step 1041 is the same as the step 1011, apart from the fact that the collected data associated with the vehicle in operation are not the data associated with the first motor vehicle. In addition, for example, but not limited to, depending on the collected data associated with the vehicle in operation, an additional adjustment coefficient, or any other normalization methods may be used, in case the data associated with the vehicle in operation differ from any of the data associated with the first motor vehicle. In addition, for example, but not limited to, in the same step, the data of the portion of the route may also be refined, in case they can be refined without using the data from the track for the first motor vehicle, such as, but not limited to, weather data associated with the portion of the route, which will be relevant at the moment the vehicle in operation passes the given portion of the route, as well as infrastructure data of the portion of the route. In general, it should be noted that the first motor vehicle and the vehicle in operation are different, and therefore energy efficiency of their tracks on a given portion of the route should also be evaluated differently, preferably, but not limited to, in the way of adjusting their values relative to the normalized values. In addition, for example, but not limited to, the step 1042 is the same as the step 1012, apart from the fact that, when collecting the data associated with the portion of the route, the refined data associated with the portion of the route from the track generated for the first motor vehicle are also collected. In general, it should be noted that, in step 1042, the collected data associated with the portion of the route will be more accurate than the similar data from the estimated track for the first motor vehicle. In addition, for example, but not limited to, the step 1043 is the same as the step 1013, apart from the fact that the data from the track generated for the first motor vehicle are collected (and, optionally, normalized) along with the data associated with the first motor vehicle and/or the portion of the route, which are also collected and, optionally, normalized. In general, it should be noted that, in step 1043, there is generated an estimated track for the vehicle in operation that takes into account both the properties of the portion of the route or the characteristics of the vehicle in operation and how the first motor vehicle passed the portion of the route. Preferably, but not limited to, the generated estimated track for the vehicle in operation further contains the estimated speed profile of the vehicle in operation, which, in turn, contains at least estimated locations of the vehicle in operation on the portion of the route and estimated speeds of the vehicle in operation on the portion of the route associated with said estimated locations. The estimated speed profile of the vehicle in operation further contains, but not limited to, estimated states of the speed control element of the an optional step 107 of generating a track database, which is one of the following: the accelerator pedal of the vehicle in operation, its brake pedal, its retarder, its intarder, its compression brake, decompression brake, its gearbox, or a combination thereof; wherein the state of the speed control element, according to the present disclosure, comprises the positions of the moving parts of the corresponding control element in its active state, i.e. relative to the state, in which the corresponding element is not activated, and/or any other active state of the element, and/or any other non-active state of the element; and wherein the estimated states of the control element are also associated with the corresponding estimated location of the motor vehicle on the portion of the route. In addition, but not limited to, as was shown above, the speed profile of the vehicle in operation may be normalized according to the data associated with the first motor vehicle. In addition, but not limited to, the speed profile of the vehicle in operation can be adjusted in advance based on the actual speed profile of the first motor vehicle, depending on the refined data associated with the portion of the route. More specifically, but not limited to, in step 1013, the properties of the portion of the route could not be considered with sufficient accuracy, since there were no actual data associated with the portion of the route, such as, but not limited to, the quality of pavement or temporary obstacles, and due to that fact the estimated track for the first motor vehicle could not possibly be energy efficient. In general, it should be noted that the estimated track for the first motor vehicle was generated using the data provided by the motor vehicle itself and external data sources only. However, but not limited to, based on how the first motor vehicle passed the given portion of the route, the track generated for the first motor vehicle can be significantly different from the estimated track for the first motor vehicle, for example, because the operator or the motion control system of the first motor vehicle were constantly assessing the situation on the portion of the route, which allowed the vehicle to pass it with higher energy efficiency than that of the estimated track, including by means of adjusting the estimated track. Thus, the estimated track generated for the vehicle in operation has by any means, not necessarily due to normalization, higher energy efficiency than the estimated track for the first motor vehicle. As will be shown below in the present disclosure, it is the estimated track generated for the vehicle in operation that becomes the pre-generated energy-efficient track for the vehicle in operation.

Figure 6:
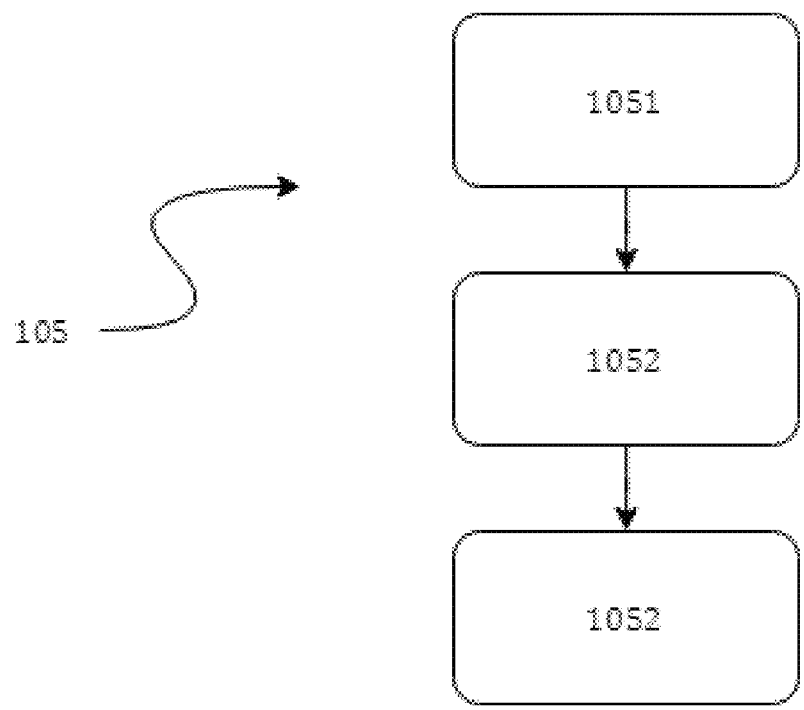
FIG. 6 illustrates an exemplary, non-limiting, diagram for the step 105 of adjusting the estimated track for the second motor vehicle.

As shown in FIG. 6, the optional step 105 of adjusting the estimated track for the vehicle in operation, for example, but not limited to, comprises the following steps: a step 1051 of determining the actual speed profile of the vehicle in operation in at least one of the moments when it passes the portion of the route; a step 1052 of comparing the actual speed profile with the corresponding estimated speed profile from the estimated track for the vehicle in operation; and, if necessary, a step 1053 of adjusting the actual speed profile in response of the vehicle in operation to the results of said comparison. For example, but not limited to, the step 1051 involves determining the location of the vehicle in operation on the portion of the route, together with at least a single wheel speed of the second motor vehicle in the specified moment in time. In addition, for example, but not limited to, the step 1052 involves determining the estimated wheel speed of at least a single wheel of the vehicle in operation in the specified moment in time, as well as matching the actual wheel speed and the estimated wheel speed. In addition, for example, but not limited to, in case the actual wheel speed differs from the estimated wheel speed, an energy consumption control signal is generated for the second motor vehicle in step 1053. This energy consumption control signal, for example, but not limited to, contains a control signal for the motion control system of the second motor vehicle, which changes the operation of the engine, and/or the brake system, and/or other technical components of the second motor vehicle, so that the actual wheel speed matches the estimated wheel speed in the specified moment in time. However, it should be obvious to a person having ordinary skill in the art that although the adjustment of the estimated track for the vehicle in operation enhances the accuracy of the subsequent generation of the energy-efficient track for the following motor vehicles thus allowing to reduce energy consumption by the following motor vehicles on a specific portion of the route, said adjustment is optional, since the step 103 described above may be sufficient for generating accurate energy-efficient tracks for the following motor vehicles.

Figure 7:
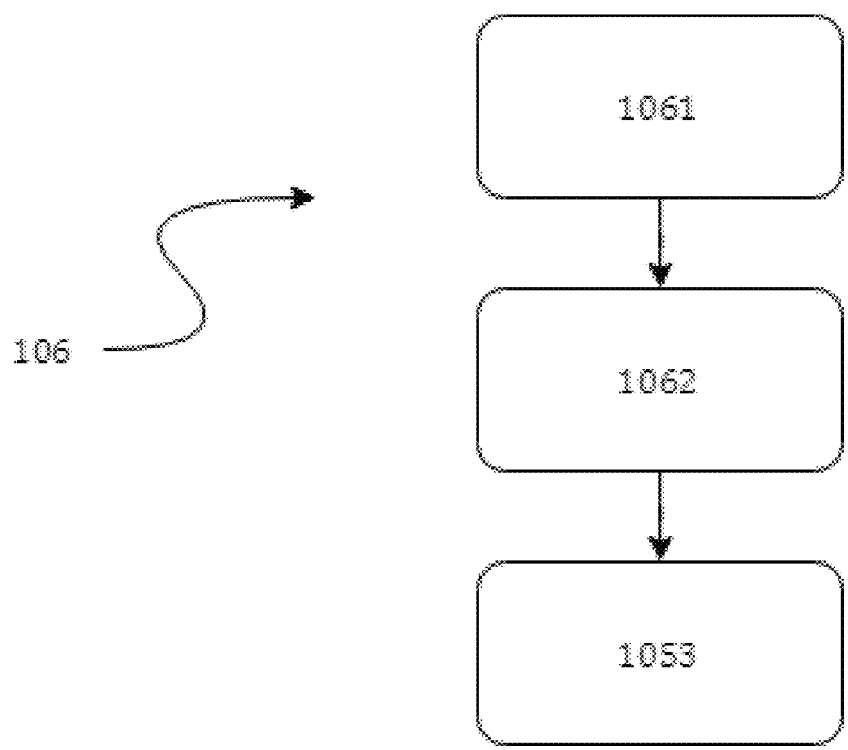
FIG. 7 illustrates an exemplary, non-limiting, diagram for the step 106 of evaluating the passing of a portion of the route by the second motor vehicle.

As shown in FIG. 7, the optional step 106 of evaluating the passing of a portion of the route by the vehicle in operation involves, for example, but not limited to, the following steps: a step 1061 of collecting secondary data associated with the vehicle in operation and/or secondary data associated with the portion of the route passed by the vehicle in operation; a step 1062 of generating an actual track for the vehicle in operation; and a step 1063 of evaluating energy efficiency of the track of the vehicle in operation. For example, but not limited to, the step 1061 of collecting secondary data involves determining the fact of passing the portion of the route by the vehicle in operation, for example, but not limited to, based on the location of the vehicle in operation relative to the boundaries of the portion of the route and/or relative to the location of the first motor vehicle at the moment of determining the fact of passing, as well as (optionally) refining the data associated with the vehicle in operation and/or the portion of the route. In general, it should be noted that, in this step, the actual data associated with the vehicle in operation and/or the portion of the route it has passed are collected. In general, it should be noted that such data may be used to generate the actual track of the vehicle in operation, based on how it passed a given portion of the route. It should also be noted that refined data associated with the vehicle in operation and/or the portion of the route can be used to evaluate energy efficiency of the actual track generated for the vehicle in operation. In addition, for example, but not limited to, the step 1062 is the same as the step 1032, apart from the fact that the secondary data collected in step 1061 can be used to generate the actual track for the vehicle in operation along with the primary data associated with the first motor vehicle and/or the portion of the route, and along with the secondary data collected in step 1032. Thus, the actual track for the vehicle in operation generated in step 1062 also contains the actual data associated with the vehicle in operation, including the actual speed profile of the vehicle in operation on the portion of the route and the actual data associated with the portion of the route, wherein these data may optionally be normalized relative to the data collected in step 1032. In addition, for example, but not limited to, the step 1063 involves evaluating energy efficiency of the track generated for the vehicle in operation. In general, it should be noted that the track generated for the vehicle in operation will be considered energy efficient in case both the time spent by the vehicle in operation to pass the portion of the route and the energy consumed by the vehicle in operation to pass the portion of the route are minimal. Thus, it should be noted that, in step 1063, energy efficiency of the estimated track for the vehicle in operation is compared to that of the actual track generated for the vehicle in operation. It should also be noted that in case the actual track for the vehicle in operation is more energy-efficient than the estimated track for the vehicle in operation, then the estimated track for any of the following motor vehicles is generated using the generated (actual) track for the vehicle in operation, even if it is different from the estimated track for the first motor vehicle, wherein the following motor vehicle is any motor vehicle that is to pass the given portion of the route after the vehicle in operation. Otherwise, it should be noted that the estimated track for the following motor vehicle is also generated based on the actual track for the vehicle in operation, taking into account the secondary data associated with the vehicle in operation and/or the portion of the route passed by it. In addition, the estimated track for the vehicle in operation can also be adjusted based on how the vehicle in operation passed the given portion of the route, using the refined data associated with the vehicle in operation and/or the portion of the route. In this case, energy efficiency of the adjusted estimated track for the vehicle in operation is evaluated. In general, it should be noted that the estimated track to be generated for the following motor vehicle has to be energy efficient, and it has to be generated taking into account the properties of the actual track of the vehicle in operation. However, it should be obvious to a person having ordinary skill in the art that although the evaluation of how the vehicle in operation passes a given portion of the route enhances the accuracy of the subsequent generation of the energy-efficient tracks for the following motor vehicles thus allowing to reduce energy consumption by these motor vehicles on a specific portion of the route, said evaluation is optional, since the aforementioned estimated track for the vehicle in operation, or even the aforementioned estimated track for the first motor vehicle, may be sufficient for subsequent generation of a model energy-efficient track for any of the following motor vehicles.

The optional step 107 of generating a track database involves, for example, but not limited to, collecting a plurality of tracks of motor vehicles generated based on how these motor vehicles, i.e. at least the first motor vehicle and the vehicle in operation, passed the portion of the route. For example, but not limited to, in step 107, the plurality of tracks of motor vehicles that have passed the portion of the route are collected. In addition, for example, but not limited to, in step 107, the collected tracks are systematized, so that these data can be used to generate a plurality of estimated tracks for the following motor vehicles. In addition, but not limited to, the plurality of such tracks can be used as an input for analysis, including by machine learning tools, in order to generate the most energy-efficient (model) track that would be suitable for any motor vehicle. Such model track can be unique for each motor vehicle and can subsequently be used as the estimated track for the first motor vehicle, whereupon the steps according to the method for generating an energy-efficient track will be performed again in order to generate a different model track for the same motor vehicle. In addition, but not limited to, such data can be used to change the properties of the portion of the route so as to ensure the generation of the most energy-efficient model track. However, it should be obvious to a person having ordinary skill in the art that although the forming of the track database enhances the accuracy of the subsequent generation of the energy-efficient tracks for the following motor vehicles thus allowing to reduce energy consumption by these motor vehicles on a specific portion of the route, said evaluation is optional, since the aforementioned estimated track for the vehicle in operation, or even the aforementioned estimated track for the first motor vehicle, may be sufficient for subsequent generation of model energy-efficient tracks for the following motor vehicles.

Figure 8:
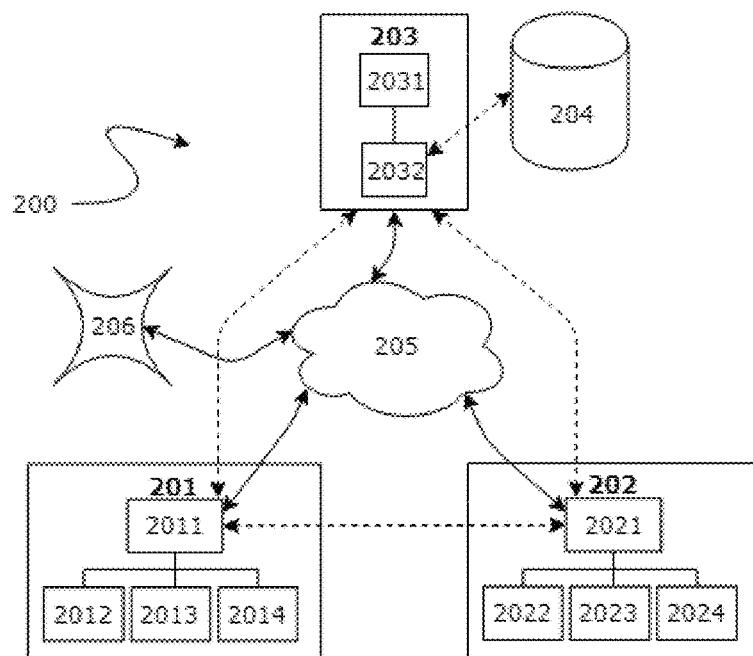
FIG. 8 illustrates an exemplary, non-limiting, diagram for the system 200 for generating an energy-efficient track for the motor vehicle.

FIG. 8 illustrates an exemplary, non-limiting, diagram for the system 200 for generating an energy-efficient track for the motor vehicle. For example, but not limited to, the claimed system 200 comprises the server 203 that communicates at least with the aforementioned transceivers 2011, 2021 of the first motor vehicle 201 and the vehicle in operation 202, respectively. In addition, but not limited to, the server 203 is a computer device comprising at least a CPU 2031 and a memory 2032. In addition, but not limited to, the memory (computer-readable medium) of the server 203 contains the program code that, when implemented, induces the CPU to perform the steps according to the method for generating an energy-efficient track for the motor vehicle that was described above with reference to FIGS. 1-7. For example, but not limited to, the computer-readable medium (memory 2031) may comprise a non-volatile memory (NVRAM); a random-access memory (RAM); a read-only memory (ROM); an electrically erasable programmable read-only memory (EEPROM); a flash drive or other memory technologies; a CD-ROM, a digital versatile disk (DVD) or other optical/holographic media; magnetic tapes, magnetic film, a hard disk drive or any other magnetic drive; and any other medium capable of storing and encoding the necessary information. In addition, but not limited to, the memory 2032 comprises a computer-readable medium based on the computer memory, either volatile or non-volatile, or a combination thereof. In addition, but not limited to, exemplary hardware devices include solid-state drives, hard disk drives, optical disk drives, etc. In addition, but not limited to, the computer-readable medium (memory 2032) is not a temporary memory (i.e. a permanent, non-transitory memory), and therefore it does not contain a temporary (transitive) signal. In addition, but not limited to, the memory 2032 may store an exemplary environment, wherein the procedure of generating an energy-efficient track for the motor vehicle may be implemented using computer-readable commands or codes that are stored in the memory of the server. In addition, but not limited to, the server 203 comprises one or more CPUs 2031 which are designed to execute computer-readable commands or codes that are stored in the memory 2032 of the device in order to implement the procedure of generating an energy-efficient track for the motor vehicle. In addition, but not limited to, the system 200 may further comprise a database 204. The database 204 may be, but not limited to, a hierarchical database, a network database, a relational database, an object database, an object-oriented database, an object-relational database, a spatial database, a combination of two or more said databases, etc. In addition, but not limited to, the database 204 stores the data to be analyzed in the memory 2032 or in the memory of a different computer device that communicates with the server 203, which may be, but not limited to, a memory that is similar to any of the memories 2032, as described above, and which can be accessed via the server 203. In addition, but not limited to, the database 204 stores the data comprising at least commands to perform the steps according to the method 100 as described above; the processed data associated with the first motor vehicle and/or the vehicle in operation, and/or the portion of the route, including refined data; estimated and generated tracks for motor vehicles; navigational data; model tracks for motor vehicles; etc. In addition, but not limited to, the exemplary system 200 further comprises, respectively, at least the first vehicle 201 and the vehicle in operation 202. Such vehicles 201, 202 usually comprise corresponding transceivers 2011, 2021 adapted to sending the data to the server 203 that communicates with motion control systems 2012, 2022 of respective vehicles and/or with on-board information systems 2013, 2023 (if present) of respective vehicles. Optionally, but not limited to, such motor vehicles may comprise various sensors 2014, 2024 to collect data that are associated with the corresponding motor vehicle in operation, and/or the portion of the route. In addition, but not limited to, the such sensors 2014, 2024 include a positioning sensor, speed sensors (such as, but not limited to, a crankshaft position sensor, a camshaft position sensor, a throttle position sensor, an accelerator pedal position sensor, a wheel speed sensor, a power consumption sensor, e.g. injection rate or current voltage characteristic), energy consumption sensors (such as, but not limited to, fuel level sensors, battery sensors, an accelerator pedal position sensor, injection rate sensor, and an RPM sensor), temperature sensors (such as, but not limited to, a coolant temperature sensor, an ambient temperature sensor, an in-car temperature sensor), pressure sensors (such as, but not limited to, an intake manifold pressure sensor, a fuel injection pressure sensor, a tyre pressure sensor), environmental sensors (such as, but not limited to, a light level sensor, a rain sensor, a radar, a lidar, a video camera, a sonar), and sensors and speed control elements of the motor vehicle, as well as other elements of the motion control system of the motor vehicle. In addition, but not limited to, there is provided a server 203, which, in addition to the functions mentioned above, stores and facilitates the execution of computer-readable commands and codes disclosed herein, which, accordingly, won't be described again. In addition, but not limited to, the server 203, in addition to the functions mentioned above, is capable of controlling the data exchange in the system 200. In addition, but not limited to, data exchange within the system 200 is performed with the help of one or more data exchange networks 205. In addition, but not limited to, data exchange networks 205 may include, but not limited to, one or more local area networks (LAN) and/or wide area networks (WAN), or may be represented by the Internet or Intranet, or a virtual private network (VPN), or a combination thereof, etc. In addition, but not limited to, the server 203 is further capable of providing a virtual computer environment for the components of the system to interact with each other. In addition, but not limited to, the network 205 provides interaction between transceivers 2011, 2021 on motor vehicles 201, 202, the server 203, and the database 204 (optionally). In addition, but not limited to, the server 203 and the database 204 may be connected directly using conventional wired or wireless communication means and methods, which, accordingly, are not described in further detail. In addition, but not limited to, the system 200 may optionally comprise infrastructure elements 206 of the portion of the route, specifically, various technical means capable of collecting the aforementioned data that are associated with motor vehicles and/or the portion of the route, and optionally can provide the aforementioned network 205 for data exchange on the portion of the route. For example, but not limited to, such elements 206 include a weather station, a speed monitoring camera, an infrastructural transceiver of the portion of the route, pavement weight sensors, etc., as well as the data from other motor vehicles that may or may not be involved with the system 200, the data transferred and propagated in data exchange environments based on data exchange technologies, such as vehicle-to-vehicle (V2V) and vehicle-to-everything (V2X). In addition, but not limited to, one of the aforementioned on-board information systems 2013, 2023, in case it is represented by a computer device comprising a CPU and a memory that are similar to the CPU 2031 and the memory 2032, may be represented by the aforementioned server 203 with its basic functions, wherein the aforementioned transceivers 2011, 2012 may be connected to each other by using any data exchange network or directly, via wireless communication, such as, but not limited to, radio communication, acoustic communication, infrared communication, laser communication, etc., wherein the database 204 may be implemented directly within the memory of one of the on-board information systems 2013 or 2023 (if present).

Figure 9:
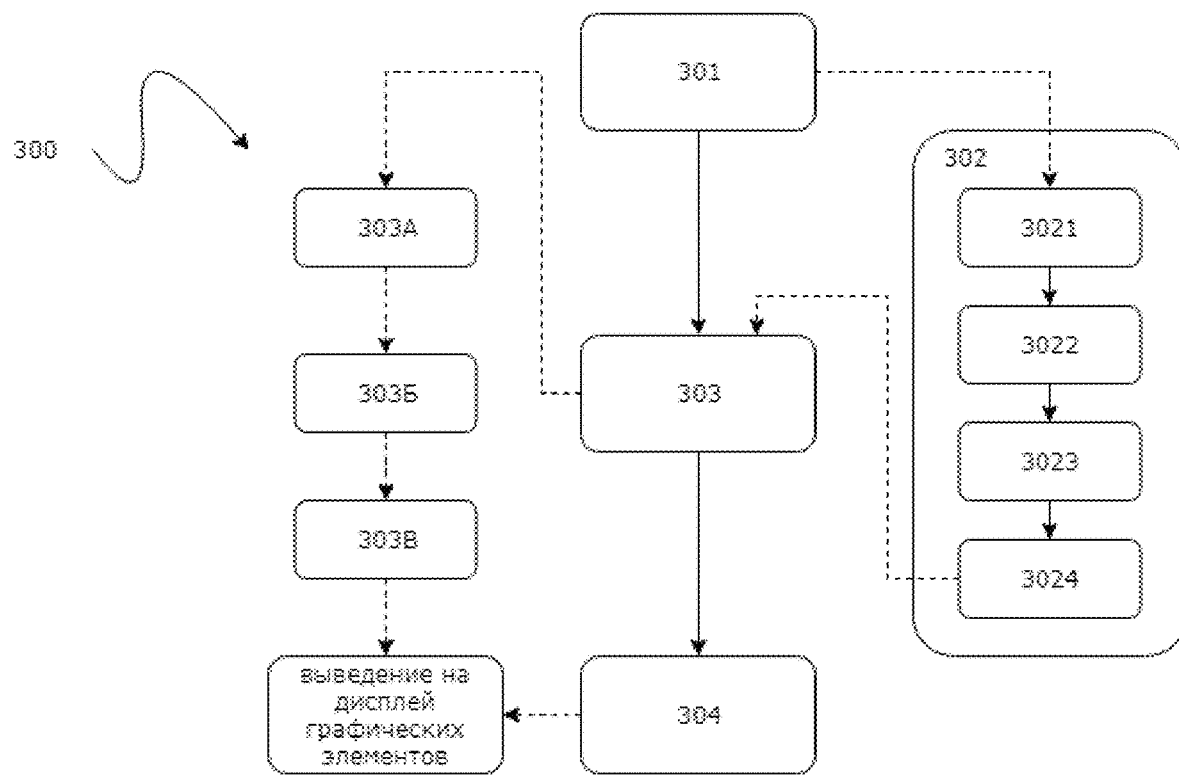
FIG. 9 illustrates an exemplary, non-limiting, diagram for the method 300 for generating a graphical user interface (GUI).
Figure 10A:
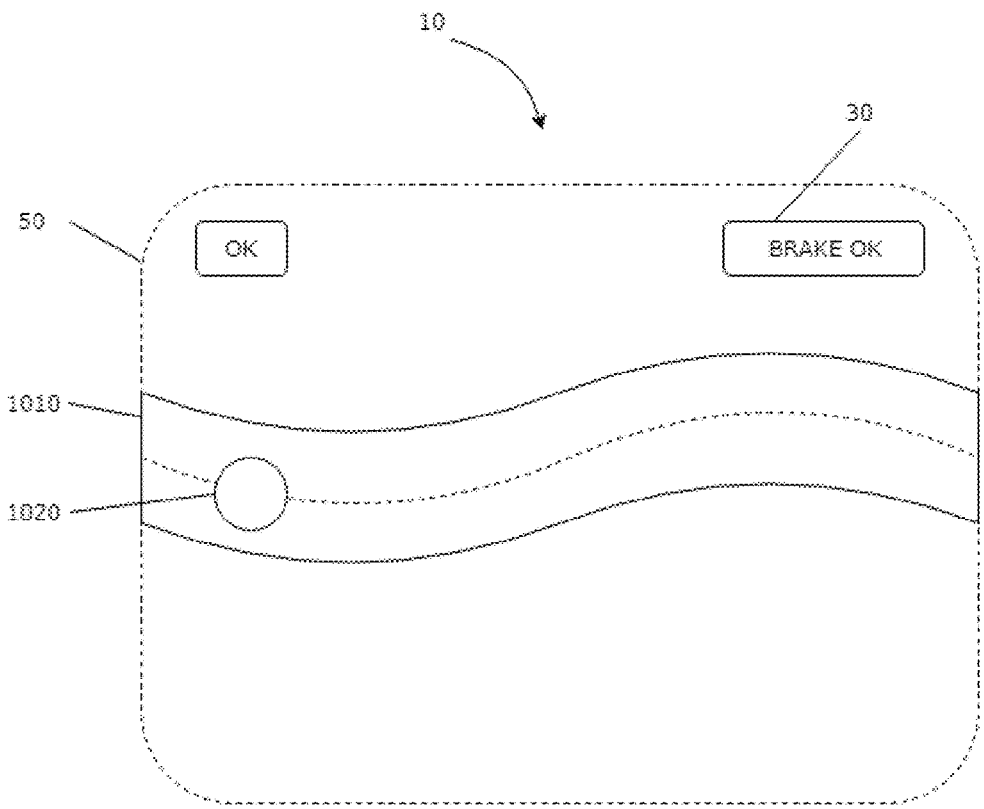
FIGS. 10A, 10B, 10C, and 10D illustrate exemplary, non-limiting, GUIs being generated.
Figure 10B:
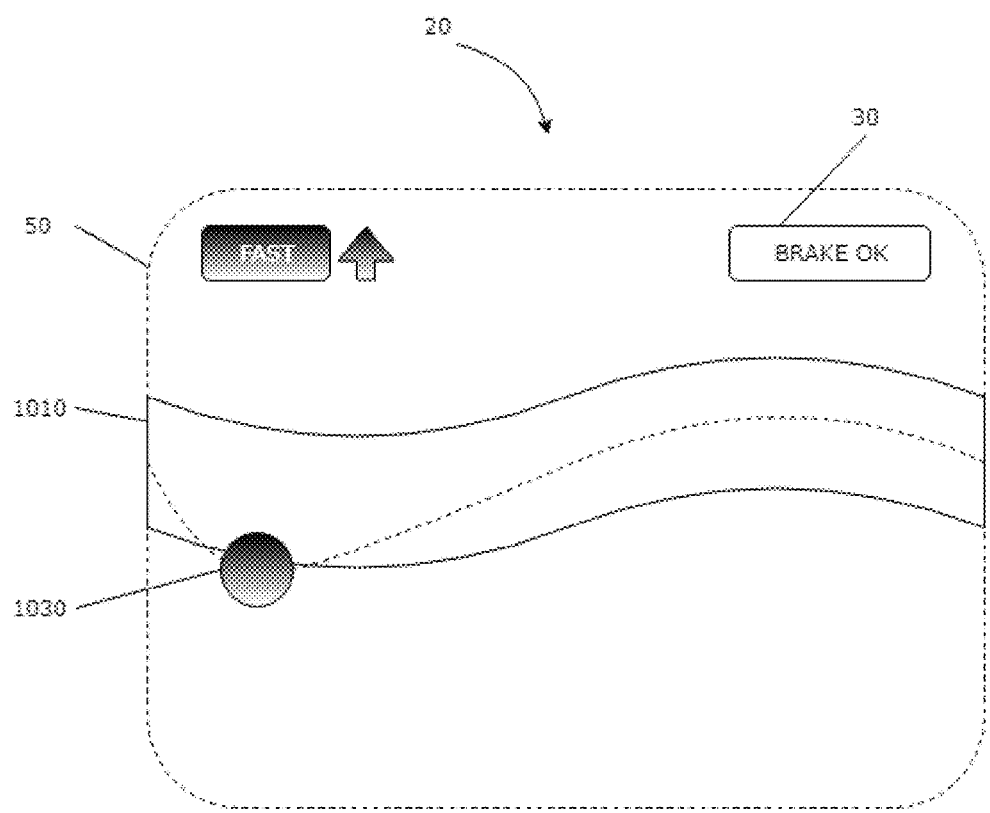
Figure 10C:
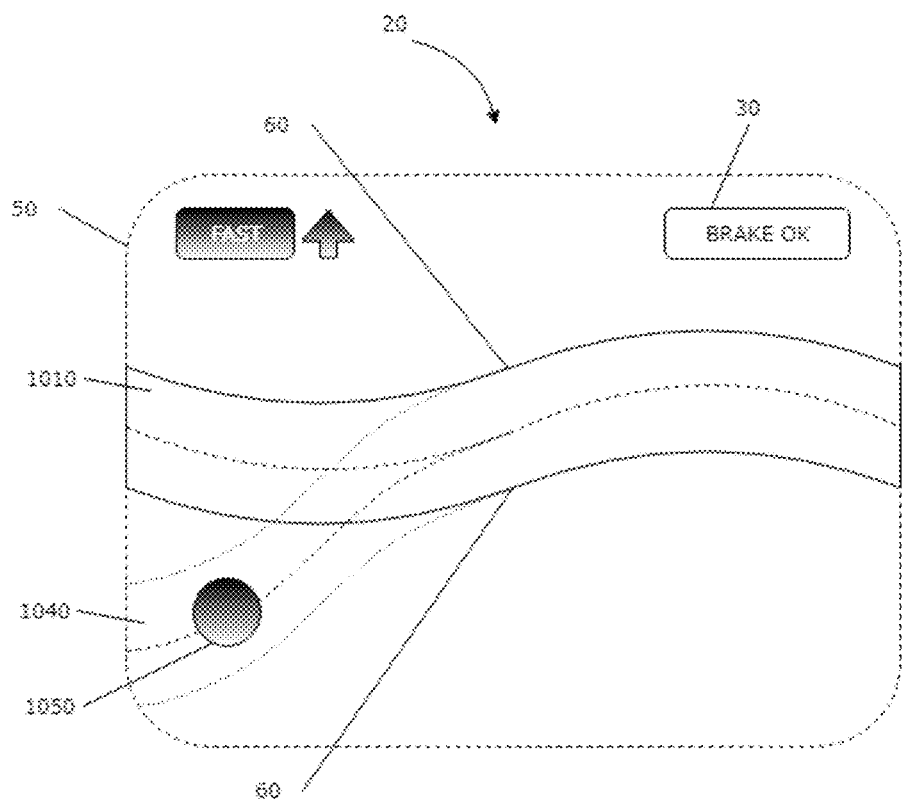
Figure 10D:
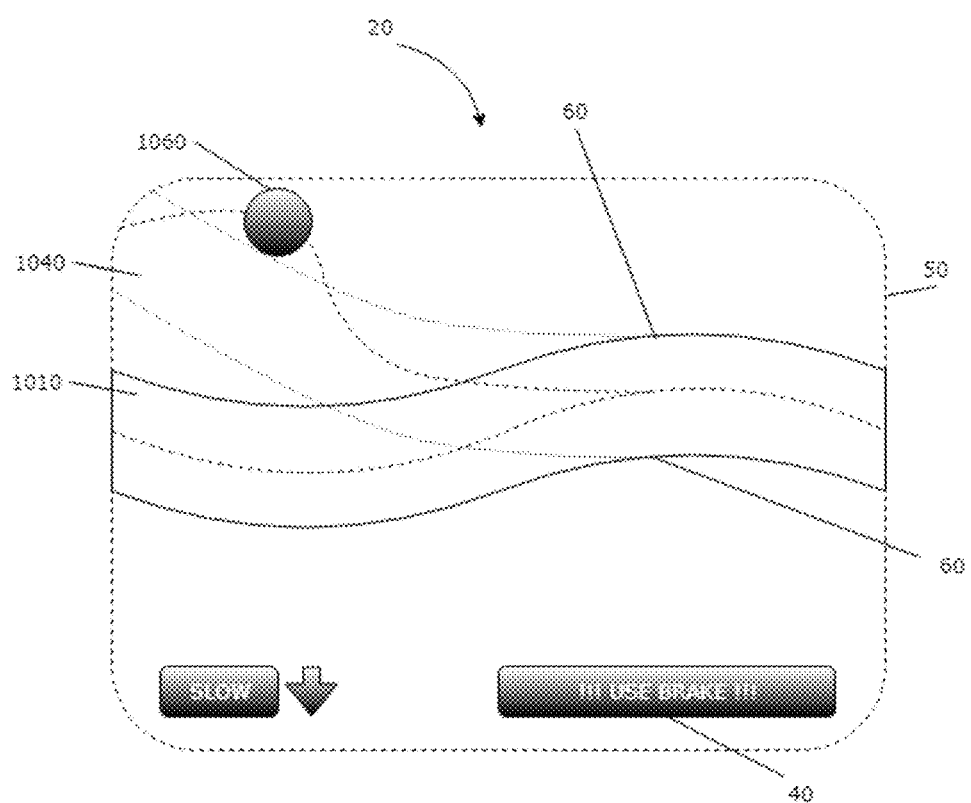

At the same time, as shown in FIG. 9, the claimed method 300 for generating a GUI can be used to generate a better and more accurate actual energy-efficient track for the vehicle in operation. Preferably, but not limited to, the claimed method 300 comprises the following steps: a step 301 of determining the current location of the motor vehicle and its parameters; an optional step 302 of generating an adjustment energy-efficient track for the vehicle in operation; a step 303 of comparing the current speed and the estimated speed of the vehicle in operation; and a step 304 of generating control signals to output graphical elements on the display. Preferably, but not limited to, in step 301, the current location of the vehicle in operation on the portion of the route and its current speed on the portion of the route are determined within the pre-generated energy-efficient track for this vehicle in operation, wherein the energy-efficient track, as was mentioned above with reference to FIG. 5, comprises at least the estimated location of the vehicle in operation on the portion of the route and its estimated speed on the portion of the route associated with the estimated location of the vehicle in operation on the portion of the route. Preferably, but not limited to, the current speed of the vehicle in operation is determined for the current location of vehicle in operation. Preferably, but not limited to, the current location of the vehicle in operation on the portion of the route corresponds to its estimated location on the portion of the route. Preferably, but not limited to, the aforementioned pre-generated energy-efficient track for the vehicle in operation was generated as was mentioned above with reference to FIG. 5, i.e. it is a pre-generated estimated track for the vehicle in operation. Preferably, but not limited to, the pre-generated energy-efficient track for the vehicle in operation comprises at least an estimated location of vehicle in operation on the portion of the route and its estimated speed on the portion of the route associated with the estimated location of the vehicle in operation on the portion of the route. Therefore, without limitation, it is known that in each point within the portion of the route, including its boundary points, the estimated speed must be of a specific value in order for the speed profile of the vehicle in operation to be energy efficient, and, therefore, to confirm that the estimated track for the vehicle in operation was energy efficient too. When the vehicle in operation is controlled by an autonomous control system, it is possible to provide a speed profile for the vehicle in operation using the data from its estimated energy-efficient track. However, when the vehicle in operation is human-operated, either directly or remotely, such human operator does not have access to computer-readable data of the estimated energy-efficient track and the data of the speed profile of the vehicle in operation moving according to the estimated energy-efficient track. Therefore, it is necessary to visualize these data to be perceived by a human operator. At the same time, even if the motor vehicle is controlled by an autonomous motion control system, it is also necessary to visualize the data of the estimated energy-efficient track and whether the speed profile of the vehicle in operation actually matches this track in order to monitor and/or analyze these data in easily perceived form. Preferably, but not limited to, in order to visualize the aforementioned data, in addition to step 301, there is provided step 303, in which the current speed of the vehicle in operation is at least compared to the estimated speed of the vehicle in operation, and after that in step 304, a control signal is generated to output a first graphical element 10 on the display, which corresponds to a match between the current speed of the vehicle in operation and its estimated speed, or to output a second graphical element 20, which corresponds to a mismatch between the current speed of the vehicle in operation and its estimated speed. Preferably, but not limited to, such graphical elements 10, 20 are shown in FIGS. 10A, 10B, 10C, 10D. As shown in FIGS. 10A, 10B, 10C, 10D, preferably, but not limited to, the graphical elements 10, 20 are selected so as to inform the human operator whether it is necessary to keep or change the current speed of the vehicle in operation so that its actual speed profile conforms to its estimated speed profile, which is a part of the pre-generated energy-efficient track for the vehicle in operation. For example, but not limited to, as shown in FIG. 10A, there may be provided a first graphical element 10 containing the text "OK" indicating that the current speed of the vehicle in operation conforms to the estimated speed of the vehicle in operation for the given point of the portion of the route. For example, but not limited to, as shown in FIGS. 10B and 10C, there may be provided a second graphical element 20 containing the text "FASTER" and, for example, but not limited to, an arrow pointing up, indicating that the current speed of the vehicle in operation does not conform to the estimated speed of the vehicle in operation for the given point of the portion of the route, and thus informing the human operator that it is necessary to increase the current speed of the vehicle in operation. For example, but not limited to, as shown in FIG. 10D, there may be provided a second graphical element 20 containing the text "SLOWER" and, for example, but not limited to, an arrow pointing down, indicating that the current speed of the vehicle in operation does not conform to the estimated speed of the vehicle in operation for the given point of the portion of the route, and thus informing the human operator that it is necessary to decrease the current speed of the vehicle in operation. For example, but not limited to, the first graphical element 10 and the second graphical element 20 have different colors, thus requiring less attention and effort on the part of the human operator to understand them. Preferably, but not limited to, the control signal to display the first graphical element 10 is generated while the current speed of the vehicle in operation in a given point of the portion of the route conforms to the estimated speed of the vehicle in operation for this point of the portion of the route. Preferably, but not limited to, the control signal to display the first graphical element 10 stops to be generated as soon as the current speed of the vehicle in operation in a given point of the vehicle in operation does not conform to the estimated speed of the vehicle in operation for this point of the portion of the route, and after that the CPU runs the required calculations to find a positive or negative difference between the current speed of the vehicle in operation and the estimated speed of the vehicle in operation in the same point of the portion of the route; wherein in case a positive difference has been found, a control signal is generated to display to second graphical element 20, which, preferably, but not limited to, corresponds to the graphical element shown in FIGS. 10B and 10C, i.e. one that informs the human operator that it is necessary to increase the current speed of the vehicle in operation; wherein in case a negative difference has been found, a control signal is generated to display to second graphical element 20, which, preferably, but not limited to, corresponds to the graphical element shown in FIG. 10D, i.e. one that informs the human operator that it is necessary to decrease the current speed of the vehicle in operation. In addition, for example, but not limited to, it is not necessary to find a precise positive or negative difference, since, in order to facilitate calculations and give the human operator enough time to respond to the need to change the current speed of the vehicle in operation, there may be provided a margin of error in calculation allowing for some percentage of discrepancy between the current speed of the vehicle in operation in a given point of the portion of the route and the estimated speed of the vehicle in operation for the same point of the portion of the route.

In addition, optionally, but not limited to, as was mentioned above with reference to FIG. 5, the pre-generated energy-efficient track for the vehicle in operation may also contain the estimated state of the speed control element of the vehicle in operation, the speed control element being one of the following: an accelerator pedal of the vehicle in operation, a brake pedal of the vehicle in operation, a retarder of the vehicle in operation, an intarder of the vehicle in operation, a compression brake of the vehicle in operation, a decompression brake of the vehicle in operation, or a gearbox of the vehicle in operation, or a combination thereof; wherein the estimated state of the speed control element of the vehicle in operation corresponds to the estimated speed of the vehicle in operation, associated with the estimated location of the vehicle in operation on the portion of the route. In this case, the aforementioned method 300, in addition to steps 301, 303, and 304, will also include an optional step 303A of determining the current state of the speed control element of the vehicle in operation; an optional step 303B of comparing the current state of the speed control element and its estimated state; and an optional step 303C of generating control signals to display a third graphical element 30 and a fourth graphical element 40. In addition, but not limited to, in step 303A, the current state of the speed control element of the vehicle in operation is determined, the speed control element being one of the following: an accelerator pedal of the vehicle in operation, a brake pedal of the vehicle in operation, a retarder of the vehicle in operation, an intarder of the vehicle in operation, a compression brake of the vehicle in operation, a decompression brake of the vehicle in operation, or a gearbox of the vehicle in operation, or a combination thereof; wherein the current state of the speed control element of the vehicle in operation corresponds to the current speed of the vehicle in operation, associated with the current location of the vehicle in operation. In addition, but not limited to, in step 303B, the current state of the speed control element of the vehicle in operation is compared with the estimated state of the speed control element of the vehicle in operation, in order to determine whether the current state of any of the speed control elements conforms to its estimated state. In addition, but not limited to, in case the current state of the speed control element conforms to its estimated state in the same point on the portion of the route, then, in step 303 of generating control signals, the step 303C will be performed to generate a control signal to display the third graphical element 30 as long as the actual state of the speed control element of the vehicle in operation conforms to the estimated state of said control element. At the same time, in case in case the current state of the speed control element does not conform to its estimated state in the same point on the portion of the route, then, in step 303 of generating control signals, the step 303B will be performed to generate a control signal to display the fourth graphical element 40. Therefore, but not limited to, the pre-generated energy-efficient track for the vehicle in operation may contain the data of estimated states of any one of speed control elements of the motor vehicle, and if, for example, but not limited to, the any one of speed control elements is a brake pedal, then, in case its current state matches its estimated state in the same point on the portion of the route, the third graphical element 30 will be displayed containing, for example, but not limited to, the text "BRAKE OK" (see FIGS. 10A, 10B, 10C) informing the human operator that it is necessary not to use brakes, so that the actual speed profile of the vehicle in operation conforms to the speed profile contained in the pre-generated energy-efficient track. At the same time, in case current state of the brake pedal does not match its estimated state in the same point on the portion of the route, the fourth graphical element 40 will be displayed containing, for example, but not limited to, the text "USE BRAKE" (see FIG. 10D) informing the human operator that it is necessary to use brakes, so that the actual speed profile of the vehicle in operation conforms to the speed profile contained in the pre-generated energy-efficient track; wherein, preferably, but not limited to, the control signal to display the third graphical element 30 stops to be generated as soon as the current state of the control element does not conform to its estimated state; and wherein, preferably, but not limited to, the control signal to display any of the graphical elements 40 stops to be generated as soon as the current state of the control element conforms to its estimated state. In addition, for example, but not limited to, in order to facilitate calculations and give the human operator enough time to respond to a change in the state of any control element, there may be provided a margin of error in calculation, and control signals may be generated with such margin of error.

At the same time, as was mentioned above, the GUI is, preferably, needed to inform the human operator in advance that it is necessary to take some action so that the vehicle in operation is moving in accordance with its energy-efficient track, i.e. to ensure that the movement of the vehicle in operation is energy efficient. Therefore, but not limited to, there is a need to provide a GUI that would allow a human operator to predict the change of the speed profile when moving according to the energy-efficient track for the vehicle in operation, since estimated speeds for each point on the portion of the route within the energy-efficient track are often different. Therefore, the speed profile of the pre-generated energy-efficient track for the vehicle in operation may contain the first preferred speed range for the vehicle in operation within the given portion of the route. Therefore, preferably, but not limited to, the first graphical element 10, as shown in FIG. 10A, further comprises a first GUI element 1010, which is a visually bounded area, wherein its boundaries are determined in accordance with the boundaries of the first preferred speed range for the vehicle in operation within the given portion of the route; and wherein, preferably, but not limited to, the boundaries of said area 1010 are not the boundaries 50 of the display screen area; and a second GUI element 1020, which is a graphical symbol displayed on the screen, wherein, preferably, but not limited to, the position of the second GUI element 1020 on the screen conforms to the current speed of the vehicle in operation, which is within the first preferred speed range for the vehicle in operation within the given portion of the route; and wherein the second GUI element 1020 is displayed within the area of the first GUI element 1010. Also, preferably, but not limited to, the second graphical element 20, as shown in FIG. 10B, comprises a first GUI element 1010 and a third GUI element 1030, which is a graphical symbol displayed on the screen, wherein, preferably, but not limited to, the position of the third GUI element 1030 on the screen conforms to the current speed of the vehicle in operation, which is outside the first preferred speed range for the vehicle in operation within the given portion of the route; and wherein the third GUI element 1030 is displayed slightly outside the area of the first GUI element 1010 or on its boundary. Therefore, preferably, but not limited to, the visually bounded area 1010 displayed on the screen is always inside the screen area, which is necessary to render the movement of the second GUI element 1020 across the screen to any of the boundaries or outside one of the boundaries of the visually bounded area 1010, in which case the second GUI element 1020 transforms into the third GUI element 1030, which indicates that the current speed of the vehicle in operation does not match its estimated speed contained in the first preferred speed range for the vehicle in operation for the given portion of the route. Therefore, when the actual speed of the vehicle in operation in any point on the portion of the route matches the estimated speed of the vehicle in operation contained in the first preferred speed range for the given point on the portion of the route, the second GUI element 1020 will be displayed on the screen inside the area 1010, wherein, as shown in FIGS. 10A, 10B, 10C, 10D, the area 1010 is itself bounded on the screen, its boundaries conforming to the boundaries of the first preferred speed range in several points on the portion of the route at once, and thanks to that the human operator will be able to maintain the speed of the vehicle in operation so as to keep the second GUI element 1020 inside the area 1010 at all times, which will indicate that in each point on the portion of the route, in which the second GUI element 1020 is inside the area 1010, the current speed of the vehicle in operation conforms to any of the speeds contained in the first preferred speed range for the vehicle in operation, i.e. the vehicle in operation is moving in accordance to the speed profile contained in the energy-efficient track for the vehicle in operation, and, therefore, its movement is energy efficient. At the same time, but not limited to, when the actual speed of the vehicle in operation in any point on the portion of the route does not match the estimated speed of the vehicle in operation contained in the first preferred speed range for the given point on the portion of the route, the third GUI element 1030 will be displayed on the screen either slightly outside the area 1010 or on its boundary (see FIG. 10B), wherein, as shown in FIGS. 10A, 10B, 10C, 10D, the area 1010 is itself bounded on the screen, its boundaries conforming to the boundaries of the first preferred speed range in several points on the portion of the route at once, and thanks to that the human operator will be able to change the speed of the vehicle in operation so as to move the third GUI element 1030 inside the area 1010 for it to transform into the second GUI element 1020, thus indicating that the speed of the vehicle in operation once again conforms to energy-efficient movement.

In addition, but not limited to, when determining the current location of the vehicle in operation in step 302, it may be found that the current location of the vehicle in operation does not match its estimated location on the portion of the route, which may indicate at least that the actual track of the vehicle in operation does not conform to the pre-generated energy-efficient track for the vehicle in operation. For example, but not limited to, this may happen because the vehicle in operation needed an emergency stop on the portion of the route or, but not limited to, because of any change in the speed of the vehicle in operation that does not conform to its speed profile contained in the pre-generated energy-efficient track for the vehicle in operation. In this case, the actual speed profile of the vehicle in operation in the stop point (as well as in any respective point of any other unacceptable, i.e. not conforming to the estimated speed profile, change in the speed of the vehicle in operation) will not conform to the speed profile contained in the pre-generated energy-efficient track for the vehicle in operation. At the same time, if the point of unexpected change in the speed of the vehicle in operation does not appear frequently on portions of the route in actual tracks for aforementioned first motor vehicles, it is almost impossible to pre-generate an energy-efficient track for the vehicle in operation that would include a change in speed in said point. More specifically, but not limited to, the most frequent points of change in speed on portions of the route in actual tracks for aforementioned first motor vehicles may include: a checkpoint, a parking lot entrance or exit, a gas station entrance or exit, a ramp, an intersection, a long obstacle, or a similar point on a portion of the route. For such frequent points, it is possible to obtain enough data to generate an energy-efficient track for the vehicle in operation that would include shifting from the energy-efficient track of the vehicle in operation to a corresponding energy-efficient track that includes a portion between the portion of the route from the main energy-efficient track for the vehicle in operation and an aforementioned frequent point, and then shifting to a corresponding energy-efficient track that includes a portion between the aforementioned frequent point and the portion of the route from the main energy-efficient track. More specifically, but not limited to, the aforementioned point of unexpected change of the speed profile on a portion of the route from the main energy-efficient track of the vehicle in operation may be represented, but not limited to, a sudden obstacle, a point on the road shoulder, a point of overtake, or any other point on the portion of the route, where the speed of the vehicle in operation lies outside the first preferred speed range for the vehicle in operation. When such points of unexpected change of the speed profile appear, preferably, but not limited to, an adjustment energy-efficient track for the vehicle in operation is generated, which is an energy-efficient track for the vehicle in operation, specially calculated so that the vehicle in operation could shift back to its main energy-efficient track with required energy efficiency. In fact, but not limited to, a special energy-efficient track will be calculated for the given vehicle in operation, as if said vehicle in operation were the first motor vehicle, i.e., simply speaking, the adjustment energy-efficient track is generated according to the step 101. At the same time, but not limited to, the vehicle in operation has already got a pre-generated energy-efficient track, which is, therefore, the main energy-efficient track for the given vehicle in operation, i.e. the adjustment energy-efficient track has to be generated in such a way that it fully conforms to the main pre-generated energy-efficient track for the vehicle in operation in the specified point of the portion of the route from the main energy-efficient track for the vehicle in operation. Preferably, but not limited to, the step 302 of generating an adjustment energy-efficient track for the vehicle in operation is performed, the step, preferable, but not limited to, comprising (see FIG. 9) a step 3021 of determining the current location of the vehicle in operation; a step 3022 of determining an adjustment portion of the route; a step 3023 of collecting primary adjustment data; and a step 3024 of generating an adjustment energy-efficient track. Preferably, but not limited to, the adjustment energy-efficient track is generated based on the energy-efficient track for the vehicle in operation. Preferably, but not limited to, in step 3021, the current location of the vehicle in operation is determined, wherein the current location of the vehicle in operation does not match its estimated location on the portion of the route, which signals that this location is a point of unexpected change of the speed profile of the vehicle in operation. Preferably, but not limited to, in step 3022, an adjustment portion of the route is determined, wherein its start coordinates match the current location of the vehicle in operation and its end coordinates match the start coordinates of the portion of the route, for which the main energy-efficient track for the vehicle in operation was generated; and wherein the start coordinates of the portion of the route, for which the main energy-efficient track for the vehicle in operation was generated are located in the vehicle in operation's direction of movement. Preferably, but not limited to, in step 3023, primary adjustment data are collected, which involves obtaining data associated with the vehicle in operation and data associated with the adjustment portion of the route. Preferably, but not limited to, such primary adjustment data generally match the primary data collected in step 101, apart from the fact that these data are collected for the vehicle in operation (which is, in this case, considered to be the first motor vehicle) and the adjustment portion of the route, respectively. Preferably, but not limited to, in step 3024, an adjustment energy-efficient track for the vehicle in operation is generated, wherein the adjustment energy-efficient track for the vehicle in operation contains at least an estimated speed profile of the vehicle in operation on the adjustment portion of the route; and wherein the estimated speed profile of the vehicle in operation contains the second preferred speed range for the vehicle in operation generated in such a way that when the vehicle in operation is moving at any of the speeds from the second preferred speed range, its speed at the start coordinates of the portion of the route, for which the main energy-efficient track for the vehicle in operation was generated, matches any of the speeds from the first preferred speed range for the vehicle in operation. Thus, but not limited to, when the vehicle in operation moves from any point of unexpected change of the speed profile, the GUI is displayed, as shown in FIG. 10C, demonstrating speed profiles for both the main pre-generated energy-efficient track and the adjustment energy-efficient track, which coincide in points 60 that match the estimated point of the portion of the route with the start coordinates of the portion of the route, for which the main energy-efficient track for the vehicle in operation was generated. Preferably, but not limited to, as shown in FIGS. 10A, 10C, and 10D, the first graphical element 10, as was mentioned above, comprises the first GUI element 1010 and the second GUI element 1020; and the second graphical element 20, preferably, but not limited to, comprises a fourth GUI element 1040, which is, preferably, but not limited to, a visually bounded area, wherein its boundaries are determined in accordance with the boundaries of the second preferred speed range for the vehicle in operation within the adjustment portion of the route; and wherein, preferably, but not limited to, the boundaries of said area are not the boundaries 50 of the display screen area; and, preferably, but not limited to, a fifth GUI element 1050, which is a graphical symbol displayed on the screen, wherein the position of the fifth GUI element 1050 on the screen conforms to the current speed of the vehicle in operation, which is within the second preferred speed range for the vehicle in operation within the adjustment portion of the route; and wherein the fifth GUI element 1050 is displayed within the area of the fourth GUI element 1040; and, preferably, but not limited to, a sixth GUI element 1060, which is a graphical symbol displayed on the screen, wherein the position of the sixth GUI element 1060 on the screen conforms to the current speed of the vehicle in operation, which is outside the second preferred speed range for the vehicle in operation within the adjustment portion of the route; and wherein the sixth GUI element 1060 is displayed outside the area of the fourth GUI element 1040 or on its boundary.

Preferably, but not limited to, the aforementioned areas 1010 and 1040 may be provided with median lines, the plurality of points on which corresponds to the most preferable speed of the vehicle in operation within the aforementioned first and second preferable speed ranges on the portion of the route or a part thereof. In addition, for example, but not limited to, the median line in any part of the display may be associated with elements 1020, 1030, 1050, 1060. For example, but not limited to, it may pass through the centers of these elements when displayed and may depend on the positions of their centers, following the elements 1020, 1030, 1050, 1060 across the display, as shown in FIGS. 10A, 10B, 10C, 10D. Preferably, but not limited to, the first element 1010 and the second element 1020 have the same color. Preferably, but not limited to, the fourth element 1040 and the fifth element 1050 have the same color. Preferably, but not limited to, the first element 1010 and the fourth element 1040 have the same color. Preferably, but not limited to, the second element 1020 and the third element 1030 have the same color. Preferably, but not limited to, the fifth element 1050 and the sixth element 1060 have the same color. Preferably, but not limited to, the second element 1020, the third element 1030, the fifth element 1050, and the sixth element 1060 have the same shape.

Therefore, the claimed method 300, preferably, but not limited to, provides a GUI that is easily perceived by a human operator and displays what speed the vehicle in operation has to have in order to pass through a given portion of the route with the required energy efficiency. According to the most preferred embodiment of the claimed method 300, but not limited to, it is used to provide the human operator with the data about the preferred speed for the vehicle in operation, so that the human operator can control its speed and thus control the position of the graphical element 1020 so that it always stays within the area 1010 or control the position of the graphical element 1050 within the area 1040 before it is transformed into the element 1020 and the area 1040 transits into the area 1010, preventing the element 1020 from being transformed into the element 1030, or the element 1050 from being transformed into the element 1060. Also, preferably, but not limited to, the graphical user interface makes it possible to remotely monitor the movement of, for example, an autonomous motor vehicle or any other motor vehicle that may correspond to the vehicle in operation. In addition, but not limited to, the visualization of GUI elements may be recorded for later playback or analysis. In addition, but not limited to, the GUI may be used for computer modeling, particularly, but not limited to, to train a human operator in energy-efficient driving.

Figure 11:
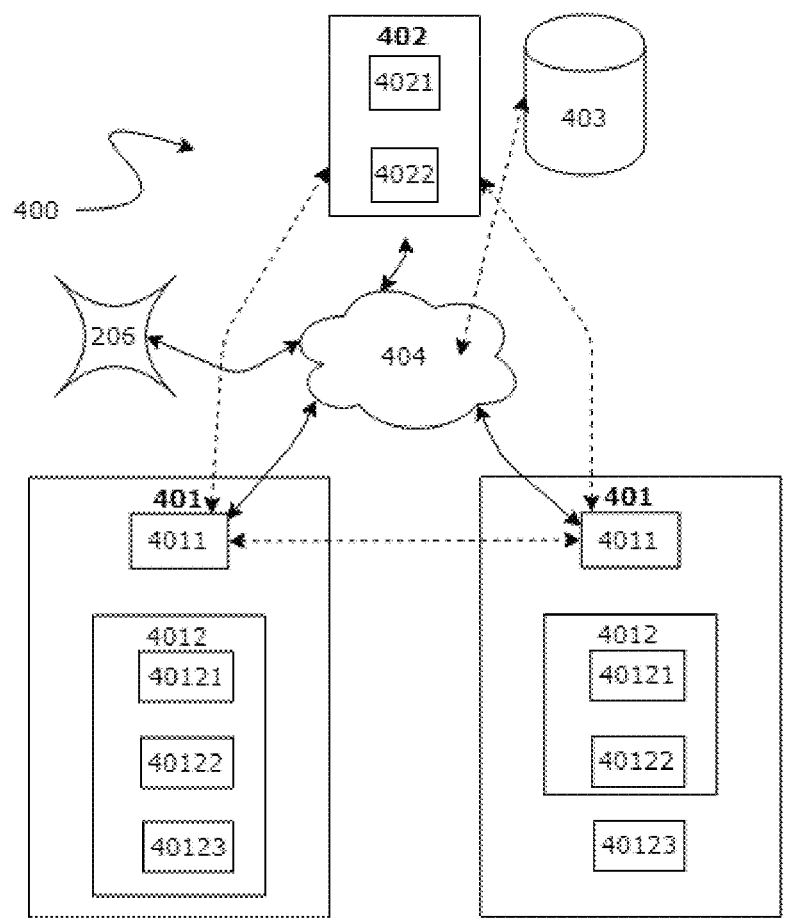
FIG. 11 illustrates an exemplary, non-limiting, diagram for the system 400 for generating a graphical user interface (GUI).
Figure 12:
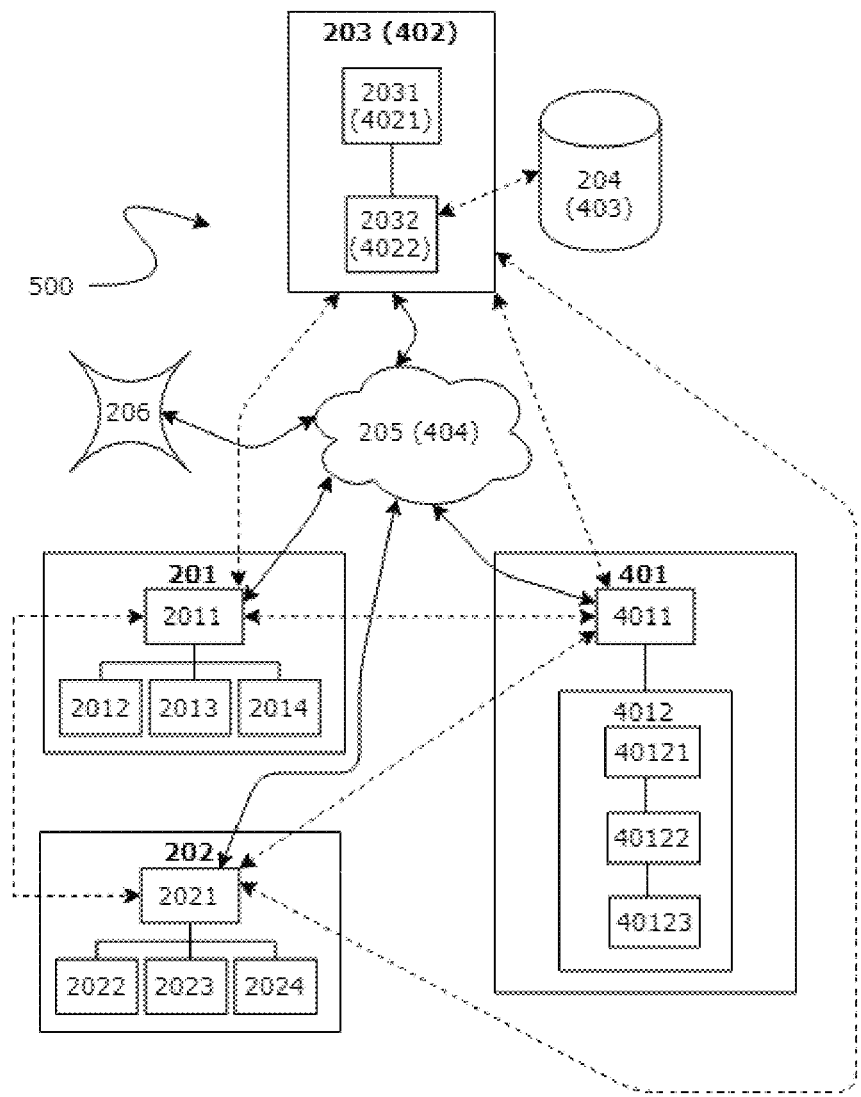
FIG. 12 illustrates an exemplary, non-limiting, general diagram for the system 500 that is a combination of the systems 200 and 400.

Preferably, but not limited to, the aforementioned method 300 for generating a GUI may be implemented by a combination of specific technical means, namely, by the system 400 for generating a GUI. FIG. 11 illustrates an exemplary, non-limiting, diagram for the system 400 for generating a graphical user interface (GUI). For example, but not limited to, the claimed system 400 for generating a GUI comprises a server 402 that is connected to at least a motion control system 4011 of a vehicle in operation 401, comprising a computer device 4012 for generating a GUI for the vehicle in operation 401. In addition, but not limited to, the server 402 is a computer device comprising at least a CPU 4021 and a memory 4022. In addition, but not limited to, the memory (computer-readable medium) of the server 402 contains the program code that, when implemented, induces the CPU to perform the steps according to the method for generating an energy-efficient track for the vehicle in operation that was described above with reference to FIGS. 1-8. For example, but not limited to, the computer-readable medium (memory 4022) may comprise a non-volatile memory (NVRAM); a random-access memory (RAM); a read-only memory (ROM); an electrically erasable programmable read-only memory (EEPROM); a flash drive or other memory technologies; a CD-ROM, a digital versatile disk (DVD) or other optical/holographic media; magnetic tapes, magnetic film, a hard disk drive or any other magnetic drive; and any other medium capable of storing and encoding the necessary information. In addition, but not limited to, the memory 4022 comprises a computer-readable medium based on the computer memory, either volatile or non-volatile, or a combination thereof. In addition, but not limited to, exemplary hardware devices include solid-state drives, hard disk drives, optical disk drives, etc. In addition, but not limited to, the computer-readable medium (memory 4022) is not a temporary memory (i.e. a permanent, non-transitory memory), and therefore it does not contain a temporary (transitive) signal. In addition, but not limited to, the memory 4022 may store an exemplary environment, wherein the procedure of generating an energy-efficient track for the vehicle in operation may be implemented using computer-readable commands or codes that are stored in the memory of the server 402. In addition, but not limited to, the server 402 comprises one or more CPUs 4021 which are designed to execute computer-readable commands or codes that are stored in the memory 4022 of the server 402 in order to implement the procedure of generating an energy-efficient track for the vehicle in operation. In addition, but not limited to, the system 400 may further comprise a database 403. The database 403 may be, but not limited to, a hierarchical database, a network database, a relational database, an object database, an object-oriented database, an object-relational database, a spatial database, a combination of two or more said databases, etc. In addition, but not limited to, the database 403 stores the data to be analyzed in the memory 4022 or in the memory of a different computer device that communicates with the server 402, which may be, but not limited to, a memory that is similar to any of the memories 4022, as described above, and which can be accessed via the server 402. In addition, but not limited to, the database 403 stores the data comprising at least commands to perform the steps according to the method 100 as described above with reference to FIGS. 1-8; the processed data associated with the first motor vehicle and/or the vehicle in operation, and/or the portion of the route, including refined data; estimated and generated tracks for motor vehicles; navigational data; model tracks for motor vehicles; etc. In addition, but not limited to, the exemplary system 400 further comprises, respectively, at least a vehicle in operation 401. Preferably, but not limited to, the vehicle in operation is a motor vehicle, as described above. Preferably, but not limited to, the aforementioned motor vehicle is a truck, or a car, or a motorbike, or a heavy-duty vehicle, such as a road train, or an off-road vehicle, or a buggy, or a pickup truck, or a bus, or a trolleybus. The vehicle in operation 401 generally comprises a moving device, such as, but not limited to, a wheel; an engine connected to the moving device, such as, but not limited to, an internal combustion engine, an electric motor, or a hybrid engine; wherein the engine actuates the moving device, so that the vehicle in operation 401 is able to move in space by consuming some kind of energy, such as, but not limited to, fuel or electricity; and wherein the vehicle in operation further comprises a motion control system 4011 adapted to control the engine of the vehicle in operation in response to control actions. Typically, such motion control system 4011 comprises at least a transmission, a braking system, a steering wheel, as well as any other motion control elements mentioned above. Generally, it should be noted that any suitable motion control system, both conventional and newly invented, can be used, since the motion control system itself is not claimed as a part of the invention according to the present disclosure. However, preferably, but not limited to, a suitable motion control system 4011 of the vehicle in operation 401 has to comprise a computer device 4012 for generating a GUI. At the same time, it should be obvious to a person having ordinary skill in the art that the computer device 4012 can be uncoupled from any element of the control system 4011, i.e. it can be an autonomous device, such as a user device, e.g. a smartphone. However, in order to implement the claimed method 300 for generating a GUI, such computer device 4012 has to be at least adapted to receive the energy-efficient track data for the vehicle in operation 401 from the server 402. In addition, but not limited to, the computer device 4012 has to comprise a CPU 40121 and a memory 40122, and it may further comprise a display 40123 or it may communicate with a data bus with a display 40123 in order to send a corresponding control signal to display the generated GUI. In general, it should be noted that, as mentioned above, preferably, but not limited to, the motion control system 4011 of the vehicle in operation 401 further comprises any kind of electronic devices 4012 capable of computation, such as a vehicle dashboard; a device for projecting visual information onto the windshield of the motor vehicle; a device for projecting visual information onto a head-up display (HUD); a head unit; a user device, also a wearable user device, for receiving and transmitting data (e.g. a transceiver), and for producing a GUI (e.g. a dashboard display); a display of the device for projecting visual information onto the windshield of the motor vehicle; a HUD of the device for projecting visual information onto a head-up display (HUD); a display of the head unit; a display of the user device, also a HUD of the wearable user device; a device for producing audio signals (e.g. speakers). Preferably, but not limited to, the electronic devices 4012 capable of computation comprise at least a CPU 40121 and a memory 40122 that stores the program code that, when implemented, induces the CPU to perform the steps according to the method 300 for generating a GUI as described above with reference to FIGS. 9, 10A, 10B, 10C, 10D. For example, but not limited to, the CPU 40121 and memory 40122 may be the main CPU and memory of the motion control system of the vehicle in operation implemented as a central controller. Preferably, but not limited to, the vehicle dashboard comprises the aforementioned CPU 40121 and memory 40122, and/or communicates with the aforementioned central controller. Preferably, but not limited to, the device for projecting visual information onto the windshield of the motor vehicle comprises the aforementioned CPU 40121 and memory 40122, and/or communicates with the aforementioned central controller. Preferably, but not limited to, the device for projecting visual information onto a HUD comprises the aforementioned CPU 40121 and memory 40122, and/or communicates with the aforementioned central controller. Preferably, but not limited to, the head unit of the motor vehicle comprises the aforementioned CPU 40121 and memory 40122, and/or communicates with the aforementioned central controller. Preferably, but not limited to, the user device may be a computer device 4012 and communicate with the motion control system 4011 of the vehicle in operation via conventional data exchange protocols, the device comprising the aforementioned CPU and memory, and/or communicates with the aforementioned central controller via conventional data exchange protocols. For example, but not limited to, the user device may be represented by a smartphone, a PDA, a tablet, a netbook, a laptop, etc. For example, but not limited to, the user device may be represented by a wearable user device, such as, for instance, a wearable display device as disclosed by the patent U.S. Ser. No. 10/176,783B2 or a similar one. When the user device is a wearable user device, it should be preferably, but not limited to, equipped by a HUD capable of displaying visual information, particularly, the GUI elements as shown in FIGS. 10A, 10B, 10C, 10D. Preferably, but not limited to, the aforementioned dashboard, head unit, and the device for projecting visual information onto the windshield of the motor vehicle should comprise a corresponding display 40123 capable of visual information output, or be somehow connected to such display 40123. Preferably, but not limited to, the aforementioned device for projecting visual information onto a HUD should comprise a corresponding HUD 40123 capable of visual information output, or be somehow connected to such display 40123. Preferably, but not limited to, the visual information to be displayed comprises at least the result of the methods 300 for generating a GUI being implemented by the CPUs 40121 of computer devices 4012 as disclosed herein. Preferably, but not limited to, the computer devices 40121 mentioned in the present disclosure are generally any suitable computer devices that comprise at least a CPU and a memory, particularly, but not limited to, the claimed electronic devices 4012 capable of computation, the user device 4012 and the server 402 of the system 400 for generating a GUI. Preferably, but not limited to, the motion control system of the vehicle in operation may be connected via a transceiver 4011 with the user device 4012, the server 402 of the system for generating a GUI, the server 203 of the system 200 for generating the energy-efficient track, other servers and control systems of other motor vehicles, but not limited to. Optionally, but not limited to, the vehicle in operation 401 may comprise various sensors to collect data that are associated with the vehicle in operation. and/or the portion of the route, and/or other motor vehicles. In addition, but not limited to, the various sensors include a positioning sensor, speed sensors (such as, but not limited to, a crankshaft position sensor, a camshaft position sensor, a throttle position sensor, an accelerator pedal position sensor, a wheel speed sensor, a power consumption sensor, e.g. injection rate or current voltage characteristic), energy consumption sensors (such as, but not limited to, fuel level sensors, battery sensors, an accelerator pedal position sensor, injection rate sensor, and an RPM sensor), temperature sensors (such as, but not limited to, a coolant temperature sensor, an ambient temperature sensor, an in-car temperature sensor), pressure sensors (such as, but not limited to, an intake manifold pressure sensor, a fuel injection pressure sensor, a tyre pressure sensor), environmental sensors (such as, but not limited to, a light level sensor, a rain sensor, a radar, a lidar, a video camera, a sonar), and sensors and speed control elements of the vehicle in operation 401, as well as other elements of the motion control system 4011 of the vehicle in operation 401. In addition, but not limited to, there is provided a server 402, which, in addition to the functions mentioned above, stores and facilitates the execution of computer-readable commands and codes disclosed herein, which, accordingly, won't be described again. In addition, but not limited to, the server 402, in addition to the functions mentioned above, is capable of controlling the data exchange in the system 400, as well as controlling the general data exchange system formed by the systems 200 and 400. In addition, but not limited to, data exchange within the system 400 is performed with the help of one or more data exchange networks 404. In addition, but not limited to, data exchange networks 404 may include, but not limited to, one or more local area networks (LAN) and/or wide area networks (WAN), or may be represented by the Internet or Intranet, or a virtual private network (VPN), or a combination thereof, etc. In addition, but not limited to, the server 402 is further capable of providing a virtual computer environment for the components of the system to interact with each other. In addition, but not limited to, the network 404 may be a common network for the common system 500 formed by systems 200 and 400, and may provide interaction between transceivers on motor vehicles 201, 202, the server 203, the database 204 (optionally), the motion control system 4011 of the vehicle in operation 401, the computer device 4012, the user device 4012, and the server 402. In addition, but not limited to, the server 402 and the database 204 may be connected directly using conventional wired or wireless communication means and methods, which, accordingly, are not described in further detail. In addition, but not limited to, the server 402 may be replaced with the server 203, and the network 404 may be replaced with the network 205 in order to combine the systems 200 and 400 into a common system 500. In addition, but not limited to, the server 402 and the server 203, as was mentioned before with reference to FIG. 8, may optionally be connected via aforementioned networks 205 and/or 404 with infrastructure elements 206 of the portion of the route, specifically, various technical means capable of collecting the aforementioned data that are associated with motor vehicles and/or the portion of the route, and optionally can provide the aforementioned networks 205 and/or 404 for data exchange on the portion of the route. For example, but not limited to, such elements 206 include a weather station, a speed monitoring camera, an infrastructural transceiver of the portion of the route, pavement weight sensors, etc., as well as the data from other motor vehicles that may or may not be involved with the system 200 and the common system that includes the system 400, the data transferred and propagated in data exchange environments based on data exchange technologies, such as vehicle-to-vehicle (V2V) and vehicle-to-everything (V2X). In addition, but not limited to, any aforementioned computer (user) device 4012 may be represented by the aforementioned server 402 with its basic functions, wherein, the motion control system 4011 of the vehicle in operation 401 may communicate with the aforementioned systems and devices on motor vehicles 201, 202 via transceivers, using any data exchange network or directly, via wireless communication, such as, but not limited to, radio communication, acoustic communication, infrared communication, laser communication, etc., wherein the database 204 may be implemented directly within the memory of the computer (user) device 4012.

The present disclosure of the claimed invention demonstrates only certain exemplary embodiments of the invention, which by no means limit the scope of the claimed invention, meaning that it may be embodied in alternative forms that do not go beyond the scope of the present disclosure and which may be obvious to persons having ordinary skill in the art.

The invention claimed is:

1. A user device for generating a graphical user interface (GUI), comprising at least:
a display;
a CPU;
a memory that stores program code that, when executed, induces the CPU to perform the following steps:
detecting a current location of a vehicle in operation on a portion of a route and a current speed of the vehicle in operation on the portion of the route within a range of a pre-generated energy-efficient track for the vehicle in operation, wherein the energy-efficient track comprises at least an estimated location of the vehicle in operation on the portion of the route and an estimated speed of the vehicle in operation on the portion of the route that is associated with the estimated location of the vehicle in operation on the portion of the route; wherein the current speed of the vehicle in operation is determined for the current location of the vehicle in operation; and wherein the current location of the vehicle in operation on the portion of the route corresponds to its estimated location on the portion of the route;
comparing the current speed of the vehicle in operation with the estimated speed of the vehicle in operation;
generating a control signal for displaying a first graphical element that corresponds to a match between the current speed of the vehicle in operation and the estimated speed of the vehicle in operation;
and generating a control signal for displaying a second graphical element that corresponds to a mismatch between the current speed of the vehicle in operation and the estimated speed of the vehicle in operation;
wherein the user device is adapted to receive at least the pre-generated energy-efficient track for the vehicle in operation from a server configured to generate an energy-efficient track;

and wherein the user device is adapted to receive at least the data containing the current speed of the vehicle in operation from a speed control system of the vehicle in operation;

wherein the pre-generated energy-efficient track for the vehicle in operation further contains an estimated state of a speed control element of the vehicle in operation, the speed control element being or selected from one of the following: an accelerator pedal of the vehicle in operation, a brake pedal of the vehicle in operation, a retarder of the vehicle in operation, an intarder of the vehicle in operation, a compression brake of the vehicle in operation, a decompression brake of the vehicle in operation, or a gearbox of the vehicle in operation, or a combination thereof;

wherein the estimated state of the speed control element of the vehicle in operation corresponds to the estimated speed of the vehicle in operation, associated with the estimated location of the vehicle in operation on the portion of the route;

wherein the method implemented by the CPU of the computer device further comprises the following steps:

determining a current state of the speed control element of the vehicle in operation, wherein the current state of the speed control element of the vehicle in operation corresponds to the current speed of the vehicle in operation, associated with the current location of the vehicle in operation;

comparing the current state of the speed control element of the vehicle in operation with its estimated state;

wherein the step of generating a control signal for displaying the first graphical element that corresponds to a match between the current speed of the vehicle in operation and the estimated speed of the vehicle in operation and generating a control signal for displaying the second graphical element that corresponds to a mismatch between the current speed of the vehicle in operation and the estimated speed of the vehicle in operation involves generating a control signal to display a third graphical element that corresponds to a match between the current state of the speed control element of the vehicle in operation and its estimated state and also involves generating a control signal to display a fourth graphical element that corresponds to a mismatch between the current state of the speed control element of the vehicle in operation and its estimated state.

2. The device of claim 1, characterized in that the pre-generated energy-efficient track for the vehicle in operation is obtained by means of a CPU of the server performing the following steps:

collecting primary data that involves obtaining data associated with a first motor vehicle, data associated with the portion of the route to be passed by the first motor vehicle, and data associated with the vehicle in operation, wherein the vehicle in operation passes the portion of the route after the first motor vehicle;

collecting secondary data that involves generating a track of the first motor vehicle, wherein said track is generated based on how the first motor vehicle passed the portion of the route;

generating an energy-efficient track for the vehicle in operation, wherein the energy-efficient track for the vehicle in operation is generated based on the track generated for the first motor vehicle;

wherein the generated energy-efficient track comprises at least an estimated location of the vehicle in operation on the portion of the route and an estimated speed of the vehicle in operation on the portion of the route that is associated with the estimated location of the vehicle in operation on the portion of the route.

3. The device of claim 2, characterized in that the pre-generated energy-efficient track further comprises a speed profile of the vehicle in operation, wherein the speed profile comprises a first preferred speed range for the vehicle in operation within the portion of the route.

4. The device of claim 3, wherein the first and second graphical elements are displayed on a screen area of the display, and characterized in that the first graphical element comprises:

a first GUI element, which is a visually bounded area, wherein its boundaries are determined in accordance with the boundaries of the first preferred speed range for the vehicle in operation within the given portion of the route, and wherein its boundaries are not the boundaries of the display screen area;

a second GUI element, which is a graphic symbol displayed on the screen, wherein the position of the second GUI element on the screen conforms to the current speed of the vehicle in operation, which is within the first preferred speed range for the vehicle in operation within the given portion of the route, and wherein the second GUI element is displayed within the area of the first GUI element;

and the device is further characterized in that the second graphical element comprises:

a first GUI element, which is a visually bounded area, wherein its boundaries are determined in accordance with the boundaries of the first preferred speed range for the vehicle in operation within the given portion of the route, and wherein its boundaries are not the boundaries of the display screen area;

a third GUI element, which is a graphic symbol displayed on the screen, wherein the position of the third GUI element on the screen conforms to the current speed of the vehicle in operation, which is outside the first preferred speed range for the vehicle in operation within the given portion of the route, and wherein the third GUI element is displayed outside the area of the first GUI element or on its boundary.

5. The device of claim 2, characterized in that the pre-generated energy-efficient track further comprises a speed profile of the vehicle in operation, wherein the speed profile contains a first preferred speed range for the vehicle in operation within the portion of the route, and further characterized in that the method implemented by the server's CPU further comprises a step of generating an adjustment energy-efficient track for the vehicle in operation, wherein the adjustment energy-efficient track is generated based on the energy-efficient track for the vehicle in operation, and wherein the step of generating an adjustment energy-efficient track comprises at least the following steps:

determining a current location of the vehicle in operation, wherein the current location of the vehicle in operation does not correspond to its estimated location on the portion of the route;

determining an adjustment portion of the route including start and end coordinates, wherein its start coordinates match the current location of the vehicle in operation and its end coordinates match start coordinates of the portion of the route, for which the energy-efficient track for the vehicle in operation was generated, and wherein the start coordinates of the portion of the route, for which the energy-efficient track for the vehicle in operation was generated, are located in direction of movement of the vehicle in operation;

collecting primary adjustment data, which involves obtaining data associated with the vehicle in operation and data associated with the adjustment portion of the route;

generating an adjustment energy-efficient track for the vehicle in operation, wherein the adjustment energy-efficient track for the vehicle in operation contains at least an estimated speed profile of the vehicle in operation on the adjustment portion of the route, and wherein the estimated speed profile of the vehicle in operation contains a second preferred speed range for the vehicle in operation generated in such a way that when the vehicle in operation is moving at any of the speeds from the second preferred speed range, its speed at the start coordinates of the portion of the route, for which the energy-efficient track for the vehicle in operation was generated, matches any of the speeds from the first preferred speed range for the vehicle in operation.

6. The device of claim 5, wherein the first and second graphical elements are displayed on a screen area of the display, and characterized in that the first graphical element comprises:
 a first GUI element, which is a visually bounded area, wherein its boundaries are determined in accordance with the boundaries of the first preferred speed range for the vehicle in operation within the given portion of the route, and wherein its boundaries are not the boundaries of the display screen area;
 a second GUI element, which is a graphic symbol displayed on the screen, wherein the position of the second GUI element on the screen conforms to the current speed of the vehicle in operation, which is within the first preferred speed range for the vehicle in operation within the given portion of the route, and wherein the second GUI element is displayed within the area of the first GUI element;

and the user device is further characterized in that the second graphical element comprises:
 a fourth GUI element, which is a visually bounded area, wherein its boundaries are determined in accordance with the boundaries of the second preferred speed range for the vehicle in operation within the adjustment portion of the route, and wherein the boundaries of said area are not the boundaries of the display screen area;
 a fifth GUI element, which is a graphical symbol displayed on the screen, wherein the position of the fifth GUI element on the screen conforms to the current speed of the vehicle in operation, which is within the second preferred speed range for the vehicle in operation within the adjustment portion of the route, and wherein the fifth GUI element is displayed within the area of the fourth GUI element;
 a sixth GUI element, which is a graphical symbol displayed on the screen, wherein the position of the sixth GUI element on the screen conforms to the current speed of the vehicle in operation, which is outside the second preferred speed range for the vehicle in operation within the adjustment portion of the route, and wherein the sixth GUI element is displayed outside the area of the fourth GUI element or on its boundary.

7. The device of claim 1, characterized in that the first graphical element and the second graphical element have different colors.

8. The device of claim 1, characterized in that the device is integrated into a vehicle dashboard.

9. The device of claim 1, characterized in that the device is a device for projecting visual information onto a windshield of the vehicle in operation.

10. The device of claim 1, characterized in that the device is a device for projecting visual information onto a head-up display (HUD).

11. The device of claim 1, characterized in that the device is integrated into a head unit of the vehicle in operation.

12. The device of claim 1, characterized in that its display is a HUD.

* * * * *